US012812714B2

(12) United States Patent
Ramachandra et al.

(10) Patent No.: US 12,812,714 B2
(45) Date of Patent: Nov. 24, 2026

(54) REPORTING FROM USER EQUIPMENT TO THE NETWORK FOR RADIO LINK MONITORING, BEAM FAILURE DETECTION, AND BEAM FAILURE RECOVERY

(71) Applicant: Telefonaktiebolaget LM Ericsson (PUBL), Stockholm (SE)

(72) Inventors: Pradeepa Ramachandra, Linköping (SE); Icaro L. J. da Silva, Solna (SE); Malik Wahaj Arshad, Stockholm (SE); Ali Parichehrehteroujeni, Linköping (SE); Angelo Centonza, Torrenueva Costa Granada (ES)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 618 days.

(21) Appl. No.: 17/429,735

(22) PCT Filed: Feb. 12, 2020

(86) PCT No.: PCT/SE2020/050150
§ 371 (c)(1),
(2) Date: Aug. 10, 2021

(87) PCT Pub. No.: WO2020/167226
PCT Pub. Date: Aug. 20, 2020

(65) Prior Publication Data

US 2022/0104300 A1 Mar. 31, 2022

Related U.S. Application Data

(60) Provisional application No. 62/805,827, filed on Feb. 14, 2019.

(51) Int. Cl.
*H04W 76/19* (2018.01)
*H04B 7/06* (2006.01)
(Continued)

(52) U.S. Cl.
CPC ........ *H04W 76/19* (2018.02); *H04B 7/06964* (2023.05); *H04W 24/10* (2013.01); *H04W 52/36* (2013.01)

(58) Field of Classification Search
CPC ..... H04W 76/19; H04W 76/18; H04W 76/15; H04W 76/10; H04W 52/30; H04W 53/30;
(Continued)

(56) References Cited

U.S. PATENT DOCUMENTS

2018/0007605 A1 1/2018 Eriksson et al.
2019/0028905 A1 1/2019 Veeramallu et al.
(Continued)

FOREIGN PATENT DOCUMENTS

CN 104137595 A 11/2014
CN 110859011 A * 3/2020 ........... H04W 24/10
(Continued)

OTHER PUBLICATIONS

Office Action issued for Japanese Patent Application No. 2021-541691—Sep. 2, 2022.
(Continued)

*Primary Examiner* — Phong La
(74) *Attorney, Agent, or Firm* — Baker Botts L.L.P.

(57) ABSTRACT

A method performed by a wireless device (110) includes, in response to detecting a radio link failure, RLF, at the wireless device, logging information related to radio link monitoring resources. In response to re-establishment after the RLF, the wireless device reports at least a portion of the logged information to a network node.

27 Claims, 22 Drawing Sheets

Measurement report may
not reach the network

(51) Int. Cl.
*H04W 24/10* (2009.01)
*H04W 52/36* (2009.01)

(58) Field of Classification Search
CPC .... H04W 24/10; H04W 24/00; H04B 7/0695; H04B 7/0696; H04B 7/0694; H04B 7/0692; H04B 7/06968; H04B 7/06952; H04B 7/06954; H04B 7/06956; H04B 7/06958
See application file for complete search history.

(56) References Cited

U.S. PATENT DOCUMENTS

| | | | | |
|---|---|---|---|---|
| 2019/0089579 | A1* | 3/2019 | Sang | H04W 40/16 |
| 2019/0166539 | A1* | 5/2019 | Chen | H04W 36/0088 |
| 2019/0208436 | A1* | 7/2019 | Zhou | H04B 17/309 |
| 2019/0261244 | A1* | 8/2019 | Jung | H04W 36/305 |
| 2019/0274169 | A1* | 9/2019 | Tsai | H04W 56/0045 |
| 2022/0110179 | A1* | 4/2022 | Sheng | B65D 5/241 |
| 2023/0397257 | A1* | 12/2023 | Jeon | H04W 56/005 |

FOREIGN PATENT DOCUMENTS

| | | | | | |
|---|---|---|---|---|---|
| CN | 110913428 | | * | 3/2020 | |
| CN | 110913428 | A | * | 3/2020 | H04L 43/06 |
| JP | WO 2018115387 | | * | 6/2018 | |
| JP | WO 2018115387 | A1 | * | 6/2018 | H04B 7/06 |
| WO | 2018 115387 | A1 | | 6/2018 | |
| WO | 2018 204863 | A1 | | 11/2018 | |
| WO | WO 2019/032882 | | * | 2/2019 | |

OTHER PUBLICATIONS

3GPP TSG-RAN WG2 Meeting #103bis; Chengdu, China, Oct. 8-12, 2018; Agenda Item: 12.2.6; Source: Huawei, HiSilicon; Title: Discussion on RACH and RLF report (R2-1813904).

3GPP TSG RAN WG3 Meeting #66; Nov. 9-13, 2009, Jeju, South Korea; Agenda Item: 12.2.2; Source: Nokia Siemens Networks; Title: RLF Reporting over X2 (R3-093057).

Official Action issued for Chinese Patent Application No. 202080014593.0—Oct. 31, 2023.

3GPP TS 36.331 v15.3.0; Technical Specification; 3rd Generation Partnership Project; Technical Specification Group Radio Access Network; Evolved Universal Terrestrial Radio Access (E-UTRA); Radio Resource Control (RRC); Protocol specification (Release 15)—Sep. 2018.

3GPP TS 36.423 v15.4.0; Technical Specification; 3rd Generation Partnership Project; Technical Specification Group Radio Access Network; Evolved Universal Terrestrial Radio Access Network (E-UTRAN); X2 application protocol (X2AP) (Release 15)—Dec. 2018.

3GPP TS 38.211 v15.4.0; Technical Specification; 3rd Generation Partnership Project; Technical Specification Group Radio Access Network; NR; Physical channels and modulation (Release 15)—Dec. 2018.

3GPP TS 38.213 v15.4.0; Technical Specification; 3rd Generation Partnership Project; Technical Specification Group Radio Access Network; NR; Physical layer procedures for control (Release 15)—Dec. 2018.

3GPP TS 38.321 v15.8.0; Technical Specification; 3rd Generation Partnership Project; Technical Specification Group Radio Access Network; NR; Medium Access Control (MAC) protocol specification (Release 15)—Dec. 2019.

3GPP TS 38.331 v15.3.0; Technical Specification; 3rd Generation Partnership Project; Technical Specification Group Radio Access Network; NR; Radio Resource Control (RRC) protocol specification (Release 15)—Sep. 2018.

PCT International Preliminary Report on Patentability issued for International application No. PCT/SE2020/050150—Jan. 18, 2021.

3GPP TSG RAN WG2 Meeting #101bis; Sanya, China; Source: Mediatek Inc.; Title: RLF Report in NR (R2-1804612)—Apr. 16-20, 2018.

3GPP TSG-RAN WG2 #103; Gothenburg, Sweden; Source: Samsung Electronics; Title: Introduction of RLF report in SA (R2-1812698)—Aug. 20-24, 2018.

PCT International Search Report issued for International application No. PCT/SE2020/050150—Apr. 20, 2020.

PCT Written Opinion of the International Searching Authority issued for International application No. PCT/SE2020/050150—Apr. 20, 2020.

* cited by examiner

Measurement report may not reach the network

REPORTING FROM USER EQUIPMENT TO THE NETWORK FOR RADIO LINK MONITORING, BEAM FAILURE DETECTION, AND BEAM FAILURE RECOVERY

PRIORITY

This nonprovisional application is a U.S. National Stage Filing under 35 U.S.C. § 371 of International Patent Application Serial No. PCT/SE2020/050150 filed Feb. 12, 2020 and entitled "REPORTING FROM USER EQUIPMENT TO THE NETWORK FOR RADIO LINK MONITORING, BEAM FAILURE DETECTION, AND BEAM FAILURE RECOVERY" which claims priority to U.S. Provisional Patent Application No. 62/805,827 filed Feb. 14, 2019 both of which are hereby incorporated by reference in their entirety.

TECHNICAL FIELD

The present disclosure relates, in general, to wireless communications and, more particularly, systems and methods reporting by user equipments (UEs) for Radio Link Monitoring (RLM), Beam Failure Detection (BFD), and Beam Failure Recovery (BFR).

BACKGROUND

In connected mode, the network typically configures the user equipment (UE) to perform and report Radio Resource Management (RRM) measurements to assist network-controlled mobility decisions, which may include, for example, handovers that are network controlled. A handover occurs when the network decides to hand over the UE from one cell to another. As a fallback, in case handovers do not work properly, a failure detection and counter-action at the UE has been specified. This is called Radio Link Failure (RLF) handling and is described below.

The RLF procedure is typically triggered when something unexpected happens in any of the mobility related procedures. That is detected thanks to some interactions between Radio Resource Control (RRC) and lower layer protocols such as L1, Medium Access Control (MAC), Radio Link Control (RLC), etc. In the case of L1, a procedure called radio link monitoring (RLM) has been introduced.

Among different issues that may trigger RLF in LTE and New Radio (NR), two of them are of particular note:

- RLF due to radio link problem (expiry of timer T301) (i.e., RLF due to problems indicated by physical layer);
- RLF due to random access problem (i.e., RLF indicated by MAC layer);

RLF triggered by other reasons such as, for example, RLC, are not described in detail herein.

With regard to RLF triggered by radio link problems (L1) in LTE, lower layers provide to upper layer Out-of-Sync (OOS) and In-Sync (IS), internally by the UE's physical layer, which in turn may apply RRC/layer 3 (i.e., higher layer) filtering for the evaluation of RLF. FIG. 1 illustrates an example of higher layer RLF related procedures in LTE. The details of UE actions related to RLF are captured in the RRC specifications (36.331), described in sections 5.2.2.9 Actions upon reception of SystemInformationBlockType2, 5.3.10.0 General, 5.3.10.7 Radio Link Failure Timers and Constants reconfiguration, 5.3.10.11 SCG dedicated resource configuration, 5.3.11.1 Detection of physical layer problems in RRC_CONNECTED and 5.3.11.2 Recovery of physical layer problems. The IE RLF-TimersAndConstants contains UE specific timers and constants applicable for UEs in RRC_CONNECTED. The RLF-TimersAndConstants information element and its field descriptions are specified in section 6.3.2.

When Discontinuous Reception (DRX) is in use, in order to enable sufficient UE power saving the out-of-sync and in-sync evaluation periods are extended and depend upon the configured DRX cycle length. The UE starts in-sync evaluation whenever out-of-sync occurs. Therefore, the same period (TEvaluate_Qout_DRX) is used for the evaluation of out-of-sync and in-sync. However, upon starting the RLF timer (T310) until its expiry, the in-sync evaluation period is shortened to 100 ms, which is the same as without DRX. If the timer T310 is stopped due to N311 consecutive in-sync indications, the UE performs in-sync evaluation according to the DRX based period (TEvaluate_Qout_DRX).

The whole methodology used for RLM in LTE (i.e. measuring the Cell-specific Reference Signal (CRS) to "estimate" the Physical Downlink Control Channel (PDCCH) quality) relies on the fact that the UE is connected to an LTE cell which is the single connectivity entity transmitting PDCCH and CRSs.

In summary, RLM in LTE has been specified so that the network does not need to configure any parameter. For example, the UE generates IS/OOS events internally from lower to higher layers to control the detection of radio link problems. On the other hand, RLF/Secondary Cell Group (SCG) Failure procedures are controlled by Radio Resource Control (RRC) and configured by the network via counters N310, N311, N313, N314, which work as filters to avoid too early RLF triggering, and timers T310, T311, T313 and T314.

With regard to RLM and the L1 input to RLF function, the purpose of the RLM function in the UE is to monitor the downlink radio link quality of the serving cell in RRC_CONNECTED state and is based on the CRSs, which are always associated to a given LTE cell and derived from the Physical Cell Identifier (PCI). This in turn enables the UE when in RRC_CONNECTED state to determine whether it is in-sync (IS) or out-of-sync (OOS) with respect to its serving cell.

The UE's estimate of the downlink radio link quality is compared with OOS and IS thresholds, Qout and Qin, respectively, for the purpose of RLM. These thresholds are expressed in terms of the Block Error Rate (BLER) of a hypothetical PDCCH transmission from the serving cell. Specifically, Qout corresponds to a 10% BLER while Qin corresponds to a 2% BLER. The same threshold levels are applicable with and without DRX.

The mapping between the CRS based downlink quality and the hypothetical PDCCH BLER is up to UE implementation. However, the performance is verified by conformance tests defined for various environments. Also, the downlink quality is calculated based on the Reference Signal Received Power (RSRP) of CRS over the whole band since the UE does not necessarily know where PDCCH is going to be scheduled.

FIG. 2 illustrates that PDCCH can be scheduled anywhere over the whole downlink transmission bandwidth.

When no DRX is configured, OOS occurs when the downlink radio link quality estimated over the last 200 ms period becomes worse than the threshold Qout. Similarly, without DRX the IS occurs when the downlink radio link quality estimated over the last 100 ms period becomes better than the threshold Qin. Upon detection of out-of-sync, the UE initiates the evaluation of in-sync.

RLF may be triggered by random access problems in LTE.

Random Access Channel (RACH) is a MAC layer procedure. Hence, it is MAC that indicates to RRC a RACH failure, which happens, for example, when the maximum number of preamble retransmissions is reached or, more specifically, after the UE has tried to perform power ramping a number of times and/or went through failed contention resolutions. More details are provided below as to how the UE may reach a maximum number of preamble retransmissions.

In LTE, a UE performs random access for many different purposes, both in RRC_CONNECTED and RRC_IDLE. LTE uses the RACH for initial network access, but in LTE the RACH cannot carry any user data, which is exclusively sent on the Physical Uplink Shared Channel (PUSCH). Instead, the LTE RACH is used to achieve uplink time synchronization for a UE which either has not yet acquired, or has lost, its uplink synchronization. Once uplink synchronization is achieved for a UE, the eNodeB can schedule orthogonal uplink transmission resources for it. Relevant scenarios in which the RACH is used are therefore:

A UE in RRC_CONNECTED state, but not uplink-synchronized, needing to send new uplink data or control information (e.g. an event-triggered measurement report);

A UE in RRC_CONNECTED state, but not uplink-synchronized, needing to receive new downlink data, and therefore to transmit corresponding ACKnowledgement/Negative ACKnowledgement (ACK/NACK) in the uplink;

A UE in RRC_CONNECTED state, handing over from its current serving cell to a target cell;

For positioning purposes in RRC_CONNECTED state, when timing advance is needed for UE positioning);

A transition from RRC_IDLE state to RRC_CONNECTED, for example for initial access or tracking area updates;

Recovering from radio link failure; and

One additional exceptional case is that an uplink-synchronized UE is allowed to use the RACH to send a Scheduling Request (SR) if it does not have any other uplink resource Random access in LTE may either be configured as contention-based random access (CBRA), which implies an inherent risk of collision, or contention-free RACH (CFRA), where resources are reserved by the network to a given UE at a given time.

Random access is captured in the MAC specifications (3GPP TS 36.321 V.15.8.9.

FIG. 3 illustrates an example of the CBRA procedure. In CBRA, the UE randomly selects a preamble and transmits with a configurable initial power. Then, it waits for a Random-Access Response (RAR) in a configurable time window. That RAR contains a Temporary Cell Radio Network Temporary Identifier (TC-RNTI) and an UL grant for MSG3. If the UE receives a RAR within the time window, it transmits MSG. If the UE has a Cell Radio Network Temporary Identifier (C-RNTI) allocated by the cell, the UE addresses MSG3 with that, otherwise it uses the TC-RNTI received in the RAR. As a preamble collision might have happened, different UEs might have received the same RAR. Thus, the network sends a MSG4 to possibly solve contention. If the UE has used the allocated C-RNTI in MSG4, that is echoed back in MSG4 to indicate that collision is resolved. Otherwise, the network addresses the UE with the TC-RNTI and includes in the MAC payload the UE identity used in MSG3. If the UE identity matches the one the UE has the UE considers the contention resolved.

In the case collision is detected, the UE shall perform preamble re-transmission and initiates random access again. Collision is considered to be detected in the following cases:

After transmitting a MSG.3 using a C-RNTI assigned by target cell (e.g. in handover or when UE is in RRC_CONNECTED), UE detects a MSG.4 not addressing its C-RNTI and contention resolution timer expires; and After transmitting a MSG.3 using a TC-RNTI assigned to it in the RAR, UE detects a MSG.4 addressing the same TC-RNTI but the UE Identity in the MSG.4 payload does not match the UE's identity transmitted on MSG.3.

Notice that collision is not considered in MAC as a failure case. Hence, upper layers are not aware that a collision has occurred.

Preamble retransmission is also triggered when the UE sends a preamble and does not receive a RAR within the RAR time window. In that case, the UE performs preamble power ramping and transmits the preamble again. In LTE, the network may also configure contention-free random access, such as in handover and resumption of downlink traffic for a UE, by allocating a dedicated signature to the UE on a per-need basis.

In all these cases, when RAR time window expires (for CFRA or CBRA) or when collision is detected, the UE performs preamble retransmission. A configured parameter controls how many times the UE shall do that, as part of the RACH-ConfigCommon. The IE RACH-ConfigCommon is used to specify the generic random access parameters and is specified in section 6.3.2.

Mobility Robustness Optimization (MRO) is provided in LTE and for RLF report. For example, seamless handovers are a key feature of 3GPP technologies. Successful handovers ensure that the UE moves around in the coverage area of different cells without causing too much interruptions in the data transmission. However, there will be scenarios when the network fails to handover the UE to the 'correct' neighbor cell in time and in such scenarios the UE will declare the radio link failure (RLF) or Handover Failure (HOF).

Upon HOF and RLF, the UE may take autonomous actions such as, for example, trying to select a cell and initiate reestablishment procedure so that we make sure the UE is trying to get back as soon as it can so that it can be reachable again. The RLF will cause a poor user experience as the RLF is declared by the UE only when it realizes that there is no reliable communication channel such as, for example, a radio link available between itself and the network. Also, reestablishing the connection requires signaling with the newly selected cell. The random access procedure may include RRC Reestablishment Request, RRC Reestablishment RRC Reestablishment Complete, RRC Reconfiguration and/or RRC Reconfiguration Complete and adds some latency, until the UE can exchange data with the network again.

According to specifications such as 3GPP TS 36.331 V 15.3.0, the possible causes for the radio link failure could be one of the following:

1) Expiry of the radio link monitoring related timer T310;
2) Expiry of the measurement reporting associated timer T312 (not receiving the handover command from the network within this timer's duration despite sending the measurement report when T310 was running);

3) Upon reaching the maximum number of RLC retransmissions; and/or

4) Upon receiving random access problem indication from the MAC entity.

As RLF leads to reestablishment, which degrades performance and user experience, it is in the interest of the network to understand the reasons for RLF and try to optimize mobility related parameters such as, for example, trigger conditions of measurement reports, to avoid later RLFs. Before the standardization of MRO related report handling in the network, only the UE was aware of some information associated to how did the radio quality looked like at the time of RLF, what is the actual reason for declaring RLF, etc. For the network to identify the reason for the RLF, the network needs more information, both from the UE and also from the neighboring base stations.

As part of the MRO solution in LTE, the RLF reporting procedure was introduced in the RRC specification in Rel-9 RAN2 work. That has impacted the RRC specifications in the sense that it was standardized that the UE would log relevant information at the moment of an RLF and later report to a target cell the UE succeeds to connect such as, for example, after reestablishment. That has also impacted the inter-gNodeB interface and the X2AP specifications such as 3GPP TS 36.423, as an eNodeB receiving an RLF report could forward to the eNodeB where the failure has been originated.

For the RLF report generated by the UE, its contents have been enhanced with more details in the subsequent releases. The measurements included in the measurement report based on the latest LTE RRC specification are:

1) Measurement quantities (RSRP, Reference Signal Received Quality (RSRQ)) of the last serving cell (PCell).

2) Measurement quantities of the neighbor cells in different frequencies of different radio access technologies (RATs) (e.g., EUTRA, UTRA, GERAN, CDMA2000).

3) Measurement quantity (e.g., Received Signal Strength Indicator (RSSI)) associated to WLAN Aps.

4) Measurement quantity (e.g., RSSI) associated to Bluetooth beacons.

5) Location information, if available (including location coordinates and velocity)

6) Globally unique identity of the last serving cell, if available, otherwise the PCI and the carrier frequency of the last serving cell.

7) Tracking area code of the PCell.

8) Time elapsed since the last reception of the 'Handover command' message.

9) C-RNTI used in the previous serving cell.

10) Whether or not the UE was configured with a DRB having QCI value of 1.

The detection and logging of the RLF related parameters is captured in section 5.3.11.3 of LTE RRC specification 3GPP 36.331.

After the RLF is declared, the RLF report is logged. Once the UE selects a cell and succeeds with a reestablishment, the UE includes an indication that the UE has an RLF report available in the RRC Reestablishment Complete message to make the target cell aware of that availability. Then, upon receiving an UEInformationRequest message with a flag "rlf-ReportReq-r9", the UE shall include the RLF report (stored in a UE variable VarRLF-Report, as described above) in an UEInformationResponse message and send to the network.

The UEInformanonRequest and UEInformationResponse messages are specified in 3GPP 36.331, section 6.2.2.

Based on the contents of the RLF report (e.g., the Globally unique identity of the last serving cell, where the failure was originated), the cell in which the UE reestablishes can forward the RLF report to the last serving cell. This forwarding of the RLF report is done to aid the original serving cell with tuning of the handover related parameters (e.g., measurement report triggering thresholds) as the original serving cell was the one who had configured the parameters associated to the UE that led to the RLF.

Two different types of inter-node messages have been standardized in LTE for that purpose, the Radio link failure indication and the handover report as specified in 3GPP TR 36.423.

The Radio link failure indication procedure is used to transfer information regarding RRC re-establishment attempts or received RLF reports between eNBs. This message is sent from the eNB2 in which the UE performs reestablishment to the eNB1 which was the previous serving cell of the UE. The Radio link failure indication indicates an RRC re-establishment attempt or a reception of an RLF Report from a UE that suffered a connection failure at eNB1. The contents of the RLF indication message is given in TABLE 1 below:

TABLE 1

| IE/Group Name | Presence | Range | IE type and reference | Semantics description | Criticality | Assigned Criticality |
|---|---|---|---|---|---|---|
| Message Type | M | z | 9.2.13 | | YES | ignore |
| Failure cell PCI | M | | INTEGER (0 . . . 503, . . .) | Physical Cell Identifier | YES | ignore |
| Re-establishment cell ECGI | M | | ECGI 9.2.14 | | YES | ignore |
| C-RNTI | M | | BIT STRING (SIZE (16)) | C-RNTI contained in the RRC Re-establishment Request message (TS 36.331 [9]) | YES | ignore |
| ShortMAC-I | O | | BIT STRING (SIZE (16)) | ShortMAC-I contained in the RRC Re-establishment Request message (TS 36.331 [9]) | YES | ignore |
| UE RLF Report Container | O | | OCTET STRING | RLF -Report-r9 IE contained in the UEInformationResponse message (TS 36.331 [9]) | YES | ignore |

TABLE 1-continued

| IE/Group Name | Presence | Range | IE type and reference | Semantics description | Criticality | Assigned Criticality |
|---|---|---|---|---|---|---|
| RRC Conn Setup Indicator | O | | ENUMERATED(RRC Conn Setup, . . .) | Included if the RLF Report within the UE RLF Report Container IE is retrieved after an RRC connection setup or an incoming successful handover | YES | reject |
| RRC Conn Reestab Indicator | O | | ENUMERATED(reconfigurationFailure, handoverFailure, otherFailure, . . .) | The Reestablishment Cause in RRCConnectionReestablishmentRequest message(TS 36.331 [9]) | YES | ignore |
| UE RLF Report Container for extended bands | O | | OCTET STRING | RLF-Report-v9e0 IE contained in the UEInformationResponse message (TS 36.331 [9]) | YES | ignore |

Based on the RLF report from the UE and the knowledge about in which cell did the UE reestablished itself, the original source cell can deduce whether the RLF was caused due to a coverage hole or due to handover associated parameter configurations. If the RLF was deemed to be due to handover associated parameter configurations, the original serving cell can further classify the handover related failure as too-early, too-late or handover to wrong cell classes. These handover failure classes are explained in brief below:

1) Whether the handover failure occurred due to the 'too-late handover' cases
   a. The original serving cell can classify a handover failure to be 'too late handover' when the original serving cell fails to send the handover command to the UE associated to a handover towards a particular target cell and if the UE reestablishes itself in this target cell post RLF. Notice that this also comprises the case where the UE has not triggered a measurement report (because the thresholds were not properly set) and/or the case the UE sends the measurement report in poor radio conditions and the network is not able to decoded it and, based on that trigger a handover. FIGS. 4A and 4B illustrates the two possible cases for handover.
   b. An example corrective action from the original serving cell could be to initiate the handover procedure towards this target cell a bit earlier by decreasing the CIO (cell individual offset) towards the target cell that controls when the IE sends the event triggered measurement report that leads to taking the handover decision.
2) Whether the handover failure occurred due to the 'too-early handover' cases
   a. The original serving cell can classify a handover failure to be 'too early handover' when the original serving cell is successful in sending the handover command to the UE associated to a handover however the UE fails to perform the random access towards this target cell (i.e. UE receives the HO command, starts timer T304 but timer expires before the UE is able to succeed with random access). An example corrective action from the original serving cell could be to initiate the handover procedure towards this target cell a bit later by increasing the CIO (cell individual offset) towards the target cell that controls when the IE sends the event triggered measurement report that leads to taking the handover decision. This also needs to consider RACH parameters (e.g. maximum number of preamble retransmissions, RAR time window, contention resolution timer, etc.) and the settings of timer T304.
3) Whether the handover failure occurred due to the 'handover-to-wrong-cell' cases
   a. The original serving cell can classify a handover failure to be 'handover-to-wrong-cell' when the original serving cell intends to perform the handover for this UE towards a particular target cell but the UE declares the RLF and reestablishes itself in a third cell.
   b. A corrective action from the original serving cell could be to initiate the measurement reporting procedure that leads to handover towards the target cell a bit later by decreasing the CIO (cell individual offset) towards the target cell or via initiating the handover towards the cell in which the UE reestablished a bit earlier by increasing the CIO towards the reestablishment cell.

To aid the serving cell to classify a handover as 'too-late' handover, the RLF reporting (via RLF indication message) from the reestablishment cell to the original source cell is enough. To classify a handover as 'too early' or 'handover to wrong cell', the serving cell may further benefit from receiving the 'handover report' message (from either the cell that re-establishment happened, or the wrong cell the UE handed over but failed while the UE Context Release message is sent to the source cell). Table 2 discloses possible Handover Report parameters:

TABLE 2

| IE/Group Name | Presence | Range | IE type and reference | Semantics description | Criticality | Assigned Criticality |
|---|---|---|---|---|---|---|
| Message Type | M | | 9.2.13 | | YES | ignore |
| Handover Report Type | M | | ENUMERATED (HO too early, HO to wrong cell, . . ., InterRAT ping-pong) | | YES | ignore |

TABLE 2-continued

| | | | | | |
|---|---|---|---|---|---|
| Handover Cause | M | Cause 9.2.6 | Indicates handover cause employed for handover from $eNB_2$ | YES | ignore |
| Source cell ECGI | M | ECGI 9.2.14 | ECGI of source cell for handover procedure (in $eNB_2$) | YES | ignore |
| Failure cell ECGI | M | ECGI 9.2.14 | ECGI of target cell for handover procedure (in $eNB_1$) | YES | ignore |
| Re-establishment cell ECGI | C-ifHandover ReportType HoToWrongCell | ECGI 9.2.14 | ECGI of cell where UE attempted re-establishment | YES | ignore |
| Target cell in UTRAN | C-ifHandover ReportType InterRATpingpong | OCTET STRING | Encoded according to UTRAN Cell ID in the Last Visited UTRAN Cell Information IE, as defined in in TS 25.413 [24] | YES | ignore |
| Source cell C-RNTI | O | BIT STRING (SIZE (16)) | C-RNTI allocated at the source eNB (in $eNB_2$) contained in the AS-config (TS 36.331 [9]). | YES | ignore |
| Mobility Information | O | BIT STRING (SIZE (32)) | Information provided in the HANDOVER REQUEST message from $eNB_2$. | YES | ignore |
| UE RLF Report Container | O | OCTET STRING | The UE RLF Report Container IE received in the RLF INDICATION message. | YES | ignore |
| UE RLF Report Container for extended bands | O | OCTET STRING | The UE RLF Report Container for extended bands IE received in the RLF INDICATION message. | YES | ignore |

| Condition | Explanation |
|---|---|
| ifHandoverReportType HoToWrongCell | This IE shall be present if the Handover Report Type IE is set to the value "HO to wrong cell" |
| ifHandoverReportType InterRATpingpong | This IE shall be present if the Handover Report Type IE is set to the value "InterRAT ping-pong" |

As described, RLF handling is similar in LTE and NR. However, the RLF triggered by radio link problems in NR has quite some differences compared to LTE i.e. in the way that OOS and IS indications are generated by L1. The cell concept in NR and the changes due to beamforming will be first described, and then RLM in NR and its differences compared to LTE will be described.

Cell and Beam-Based Mobility Concept in NR

In LTE, each cell broadcasts a primary and secondary synchronization signal (PSS/SSS) that encodes a physical cell identifier. This is how a UE identifies a cell in LTE. In NR, equivalent signals also exist. In addition, as NR is designed to be possibly deployed in higher frequencies (e.g., above 6 GHz) where beamforming is massively used, these should be possibly beamformed for the same cell (and possibly in a time-domain manner, in a beam sweeping). When transmitted in different beams, each of these PSS/SSS for the same cell has its own identification, in what is called an Synchronization Signal and PBCH Block (SSB), as in addition, Master Information Block (MIB) is also included in each beam.

Thus, one could say that a cell in NR is basically defined by a set of these SSBs that may be transmitted in one (typical implementation for lower frequencies such as below 6 GHz) or multiple downlink beams (typical implementation for lower frequencies such as below 6 GHz). For the same cell, these SSBs carry the same physical cell identifier (PCI). For standalone operation (i.e., to support UEs camping on an NR cell), they also carry in System Information Block Type 1 (SIB1) the RACH configuration, which comprises a mapping between the detected SSB covering the UE at a given point in time and the PRACH configuration (e.g., time, frequency, preamble, etc.) to be used. For that, each of these beams may transmit its own SSB which may be distinguished by an SSB index. FIG. 5 illustrates an example transmission of SSB.

These SSBs may be used for many different purposes, including RRM measurements such as to assist connected and idle mode mobility, beam selection upon random access, and last, but not least, which is one of the main topics of the present disclosure, beam failure detection and radio link monitoring. In addition to SSBs, for most of these purposes listed above, the network may also configure CSI-RS resources via dedicated signaling to each UE, where each resource may also be beamformed and transmitted in multiple beams.

Radio Link Monitoring (RLM) and the L1 Input to RLF Function in NR

In NR, RLM is also defined for a similar purpose as in LTE. Specifically, RLM is defined for monitoring the downlink radio link quality of the serving cell in RRC_CONNECTED state. In particular, RLM is used for monitoring the quality of control channels so that the network can contact the UE to schedule information. However, differently from LTE, some level of configurability has been introduced for RLM in NR in terms of RS type/beam/RLM resource configuration and BLER thresholds for IS/OOS generation.

Explicit RLM Resource Configuration

Above, it was disclosed that in NR, two different reference signal (RS) types (SSBs and CSI-RSs) are defined for RRM measurements for mobility assistance, RLM, beam failure detection, etc. There are different reasons to define the two RS types. One reason is the possibility to transmit SSBs in wide beams while CSI-RSs in narrow beams. The other reason is the ability to change the beamformer of CSI-RS dynamically without affecting the idle mode coverage of the cell, which would have changed if SSB beamformer is changed.

In NR, the RS type used for RLM is also configurable. Both CSI-RS based RLM and SS block based RLM are supported. The RS type for RLM should be configured via RRC signaling. As NR can operate in quite high frequencies (above 6 GHs, but up to 100 GHz), these RS types used for RLM can be beamformed. In other words, depending on deployment or operating frequency, the UE can be configured to monitor beamformed reference signals regardless which RS type is selected for RLM. Thus, differently from LTE, RS for RLM can be transmitted in multiple beams.

As there can be multiple beams, the UE needs to know which ones to monitor for RLM and how to generate IS/OOS events to be indicated to upper layers (so upper layers are able to control the triggering of RLF). In the case of SSB, each beam can be identified by an SSB index (derived from a time index in PBCH and/or a PBCH/DRMS scrambling), while in case of CSI-RS, a resource index is also defined (signaled with the CSI-RS configuration).

In NR, the network can configure by RRC signaling, X RLM resources to be monitored, either related to SS blocks or CSI-RS, as follows:

- One RLM-RS resource can be either one SS/PBCH block or one CSI-RS resource/port;
- The RLM-RS resources are UE-specifically configured;
- When UE is configured to perform RLM on one or multiple RLM-RS resource(s),
  - Periodic IS is indicated if the estimated link quality corresponding to hypothetical PDCCH BLER based on at least one RLM-RS resource among all configured X RLM-RS resource(s) is above Q_in threshold;
  - Periodic OOS is indicated if the estimated link quality corresponding to hypothetical PDCCH BLER based on all configured X RLM-RS resource(s) is below Q_out threshold;
    - That points in the direction that only the quality of best beam really matters at every sample to generate OOS/IS events. In other words, if the best beam is below the threshold (i.e. all others would also be), then an OOS event is generated. Same for IS event, as long as the best is above (all other do not matter).

One observation is that changing bandwidth part (BWP) may lead to changes in the RLM resources the UE monitors, especially if the PDCCH configuration also changes. And, in addition, there could be a need to change the RS type the UE monitors as the target active BWP may not include the RS type/resources the UE was monitoring in the previous active BWP. Each BWP is associated with its own set of RLM-RSs.

The RLM configuration provided to the UE with dedicated signalling is specified in the RRC specifications.

RLM Resource Configuration Via Transmission Configuration Indicator (TCI) States NR has yet another way to perform RLM, which is using the concept of TCI states. The field failureDetectionResourcesToAddModList in the RLM configuration above is described as a list of reference signals for performing RLM but if no RSs are provided in this list for the purpose of RLF detection, the UE performs Cell-RLM based on the activated TCI-State of PDCCH as described in 3GPP TS 38.213, clause 5. The network ensures that the UE has a suitable set of reference signals for performing cell-RLM.

As noted above, the term TCI state stands for Transmission Configuration Indicator state. It is used to introduce dynamics in beam selection. The UE can be configured through RRC signaling with N TCI states, where Nis up to 64, and depends on UE capabilities. Each state contains a Quasi-Co-Location (QCL) information such as, for example, one or two source DL RSs, each combined with a QCL type. Since a TCI state contains QCL Type D information for one of the RSs, the N TCI states can be interpreted as a list of N possible beams transmitted from the network. The other source DL RS in the TCI state may be used for time/frequency QCL purposes. A first list of available TCI states is configured for PDSCH, and a second list of TCI states is configured for PDCCH contains pointers, known as TCI State IDs, to a subset of the TCI states configured for PDSCH. The network then activates one TCI state for PDCCH (i.e. provides a TCI for PDCCH) and up to eight active TCI states for PDSCH. Each configured TCI state contains parameters for the QCL associations between source reference signals (CSI-RS or SS/PBCH) and target reference signals (e.g., PDSCH/PDCCH DMRS ports). TCI states are also used to convey QCL information for the reception of CSI-RS.

Another important concept in NR is the CORESET (Control resource set), where some of the parameters of PDCCH configuration are provided. The CORESET defines the length (1, 2, or 3 OFDM symbols) as well as a frequency-domain allocation of the PDCCH allocation. It is the CORESET configuration that defines the TCI state that is used to receive the PDCCH candidates transmitted in that CORESET. Each CORESET can have a different TCI state configured/activated, enabling the possibility to use different transmit beams for different PDCCH candidates.

In total, it is possible to configure the UE with 3 CORESETs.

The IE ControlResourceSet is used to configure a time/frequency control resource set (CORESET) in which to search for downlink control information (see TS 38.213 [13], clause FFS_Section). For each CORESET one can configure a list of TCI states, where each state is defined as follows:

TCI-State

The IE TCI-State associates one or two DL reference signals with a corresponding quasi-colocation (QCL) type.

IS/OOS and BLEB Threshold Configuration

The UE needs to know which resources to monitor, but also how to generate IS/OOS events to be reported internally to higher layers. While LTE the SINR maps to a 10% BLER for the generation of OOS events and the SINR maps to a BLER of 2% for the generation of IS events, configurable values can be defined in NR. Currently, LTE like 10% and 2% BLER can be configured for OOS and IS events and another pair of X % and Y % will be standardized once a URLLC type of application related requirements are put in place and RAN4 has evaluated the feasibility of these requirements. Thus, differently from LTE, the BLER thresholds for IS/OOS generation will be configurable.

Concept of BW (Bandwidth) Parts and Multi-SSBs

RAN1 introduced the concept of Bandwidth Parts (BWP), which intends to configure the UE with an operation bandwidth that can be less than the actual carrier bandwidth. This has similarities to the handling of "bandwidth reduced" UEs in LTE (Cat-M1) that are not able to operate on the entire carrier bandwidth. Note that the discussion is primarily about carriers spanning several 100 MHz and UEs supporting, for example, "only" carriers of 100 MHz. In other words, this concept addresses UEs supporting an operating bandwidth that is 100 times wider than for Cat-M1. Like in LTE, Cat-M1 the configured BWP may not coincide with the carrier's SSB (PSS/SSS/MIB) and it must be discussed how the UE acquires cell sync, performs measurements and acquires SIB in such cases. Besides this core part of the BWP functionality, RAN1 also discussed other flavors with additional SSBs in the same carrier or in the same BWP as well as the possibility to configure a UE with several possibly overlapping BWPs among which the network can switch by means of L1 control signals such as DCI. FIG. 6 illustrates BW of a single wide Component Carrier (CC). Specifically, UE 1 is associated with a maximum BW that includes only part #1. By contrast, UE 2 is associated with a maximum BW that includes part #1 and part #2.

The downlink and uplink bandwidth parts determine the frequency range in which the UE is required to receive and transmit data channels such as PDSCH and PUSCH and corresponding control channels such as PDCCH and PUCCH. As a starting point, a BWP cannot span more than the configured carrier bandwidth.

As opposed to using only the carrier bandwidth, a key aspect of the BWP concept is to support UEs that cannot handle the entire carrier bandwidth. UEs supporting the full carrier bandwidth can also utilize the entire carrier. Using dedicated signalling, the NW may configure the DL BWP and the UL BWP in accordance with the UE capabilities.

The BWPs can be configured by dedicated signalling in the first RRCReconfiguration after connection establishment (i.e., when the NW knows the UE capabilities). However, already before that point in time the UE must read PDCCH and PDSCH to acquire SIB1, to receive Paging messages and to receive Msg2, Msg4 and the above-mentioned RRCReconfiguration. Hence, the UE must be configured with an "initial BWP".

A network may still decide to configure a wider initial BWP than some UEs support. This may be the case if the NW wants to optimize the SIB acquisition time or connection establishment time by using a wider bandwidth. But this situation may also occur if a legacy network does not yet support UEs with lower complexity. The UE discovers this based on the initial BWP configured in MIB and since it cannot acquire SIB1 it should consider the cell as barred.

Upon successful connection establishment, the network should configure a BWP in accordance with the UE capabilities. The BWP configuration is specific for a serving cell, i.e., the network must at least configure a DL BWPs for each serving cell. And UL BWP is configured for PCells and for SCells with configured UL.

In LTE, each cell was characterized by its center frequency (UL+DL for FDD), by the carrier bandwidth, and by the physical cell ID conveyed in PSS/SSS. The PS S/SSS used to be at the carrier's center frequency. In NR, the SSB-frequency is not necessarily the center frequency which will require signaling both values or one value and an offset (as already discussed in the context of RRM measurements). Upon initial access, the UE must discover the (one) SSB, acquire sync, acquire MIB and then attempt to read SIB1. At this point the UE has selected the cell, i.e., an SSB on a certain frequency.

When the UE establishes an RRC connection, the NW may configure a dedicated BWP. That BWP may overlap with the SSB's frequency. If so, the UE is able to (re-) acquire the SSB at any time in order to re-gain sync and to perform SS-based measurements.

However, if operating bandwidth of a cell (carrier) is wide and if many UEs have an operation bandwidth which is significantly narrower than the carrier bandwidth, the network will allocate UEs to BWPs that do not coincide the with SSB frequency to balance the load and to maximize the system capacity. As in LTE Cat-M1 this implies that these UEs need (inter-frequency, intra-carrier) measurement gaps to re-sync with their serving cell's SSB and to detect and measure neighbor cells. At the same time, the RLM related measurements are performed by the UE more often than the RRM related measurements. Therefore, the network is expected to provide the RLM-RS in the active BWP for a given UE. So, there is no measurement gaps associated to performing RLM measurements.

RLF Triggered by Random Access Problems (MAC) in NR—Beam Failure Recovery (BFR)

In LTE, random access is used by different procedures. In NR, a procedure called Beam Failure Recovery (BFR) has been defined and relies on random access to indicate. Hence, a failure in the BFR procedure leads to a random-access failure that is indicated to the higher layers so that RLF is triggered. The BFR procedure is described below.

In NR, BFR relies on beam selection and random-access procedure. The procedure is assisted by the monitoring procedure called Beam Failure Detection (BFD) that, when it occurs, triggers BFR. Making an analogy, RLF is a RRC procedure triggered when the UE is out of cell coverage in connected mode, because L3 mobility may have failed, and shall perform autonomous actions to re-gain connectivity with the network, possibly in another cell. On the other hand, BFR is a L1/MAC procedure triggered when the UE is out of beam coverage (or at least out of coverage of a pre-determined set of beams e.g. beams overlapping coverage with beams used for PDCCH transmission for that UE) because beam management procedures may have failed, and UE shall perform autonomous actions to re-gain connectivity with the same cell (i.e. also in configured candidate beams covered by the same cell).

The UE is configured with BFD resources to be monitored, i.e., a subset of beams in cell coverage, and BFR resources, another set of beams in cell coverage. These BFD and BFR resources can be associated to either SSBs or CSI-RSs, similar to RLM. The UE continuously monitors the BFD resources to check if it is still within the coverage of these beams. If the UE is not under the coverage (as defined with certain Qout threshold), the UE performs the beam recovery using the BFR related UL resources. In this way, the UE and the network maintain a set of beams using at least one of which they can reach each other. When the UE fails to reach the network using any of the BFR resources, the UE declares RLF.

There is a relation between RLM and BFD. The UE may be configured to only perform RLM with a set of resources. In that case, the UE monitor these resources to generate OOS indications to upper layers so RLF may be triggered under certain conditions. The UE may be configured to only perform BFD or both BFD+RLM, where each configured resource is indicated to be associated to either RLM, BFD or both BFD/RLM.

The IE RadioLinkMonitoringConfig is used to configure radio link monitoring for detection of beam- and/or cell radio link failure. See also 3GPP TS 38.321, clause 5.1.1.

The RadioLinkMonitoringConfig information element is specified in 3GPP TS 38.331, section 6.3.2.

If no RSs are provided for the purpose of beam failure detection, the UE performs beam monitoring based on the activated TCI-State for PDCCH. In other words, if no RSs for beam failure detection are not explicitly configured, the UE defaults to use the RSs which the UE uses as QCL reference for the reception of the PDCCH DMRS, which is identical to the RSs in the activated TCI state(s). If RSs for RLM are not explicitly configured, the UE defaults to use the RSs which the UE uses as QCL reference for the reception of the PDCCH DMRS, which is identical to the RSs in the activated TCI state(s).

Beam recovery and radio link monitoring (RLM) are related to beam management. Radio link monitoring is a well-known procedure from LTE, where the UE is monitoring the quality of its serving cell to determine if the NW is unable to reach the UE. In LTE, the UE performs measurements on the CRS, and uses these measurements to estimate what the BLER of PDCCH would be if it were transmitted. In practice, the UE estimates the channel quality, e.g., Signal-to-Interference-plus-Noise ratio (SINR). The UE then triggers an internal out-of-sync (OOS) event if the BLER of a PDCCH received at this SINR level would be higher than 10%. When the UE has detected a certain number of consecutive OOS indications, the UE starts the T310 timer, and when the T310 expires, the UE declares radio link failure (RLF). Radio link failure is a severe failure case, where the UE essentially has no coverage from its serving cell. One situation where this may happen is if the network has failed to perform a handover to a new cell. After declaring RLF, the UE can establish connection with the new cell. In some cases, the UE has simply moved out of coverage, in which case the UE is unable to establish connection to a new cell.

In NR, RLM is similar to the LTE RLM. The only difference is that since there is no CRS, the UE uses another RS to perform RLM. In NR, the UE can be configured to use either a set of SS/PBCH blocks and/or a set of periodic CSI-RSs to perform RLM. L1 in the UE would generate an OOS indication when the quality of all the configured RSs fall below a certain threshold; otherwise an IS indication would be generated. The beam recovery procedure was designed to handle a situation where the beams of the UE and the gNB have become misaligned, and normal beam management procedures have become ineffective. During beam recovery, the UE initiates a realignment of the beams, by performing either contention-based or contention-free random access. One situation where this may happen is when the beam management algorithms have failed to update the active TCI state, leading to that the UE's Rx beam is misaligned.

To discover the beam misalignment, the UE will monitor a set of periodic reference signals, either SS/PBCH blocks or CSI-RS. The monitoring procedure is similar to RLM, but a different set of reference signals may be used. Also, for beam monitoring, there is no generation of in-sync indications, only out-of-sync indications are generated. The MAC layer in the UE interprets the absence of an out-of-sync indication as an in-sync indication. The UE generates an out-of-sync indication if all the monitored RSs fall below a certain threshold.

RLM and beam monitoring have some similarities: both procedures try to detect when the channel quality is below a certain threshold. Once the channel quality is below the threshold, the UE determines that it is unreachable by the NW and takes action. The main difference is the actions taken: for beam recovery, the UE quickly initiates a random access procedure in the serving cell. For RLM, the UE starts the T310 timer, and once the timer expires, the UE will declare radio link failure, perform cell reselection, and RRC reestablishment. The NW configures the UE to independently perform RLM and/or beam recovery, and there is currently no relation between the procedures. In particular, in case the UE attempts to perform beam recovery, but fails to find any suitable RS in the serving cell, the UE will not declare RLF: RLF will be triggered once T310 expires.

The number of RSs (X) the UE can be configured to monitor for RLM depends on the frequency band:

For carrier frequencies below 3 GHz, X=2;

For carrier frequencies between 3 GHz and 6 GHz, X=4;

For carrier frequencies above 6 GHz, X=8.

For beam monitoring, the UE can be configured with 1 or 2 RSs. The underlying idea is that each RSs is associated with one CORESET.

If RSs for beam failure detection are not explicitly configured, the UE defaults to use the RSs which the UE uses as QCL reference for the reception of the PDCCH DMRS, which is identical to the RSs in the activated TCI state(s). If RSs for RLM are not explicitly configured, the UE defaults to use the RSs which the UE uses as QCL reference for the reception of the PDCCH DMRS, which is identical to the RSs in the activated TCI state(s).

How the UE combines the two RSs in one TCI state is still unclear, but it is likely that it will be up to UE implementation.

For both RLM and beam monitoring, the UE monitors UE-specifically configured periodic RS resource(s) to estimate the quality of a hypothetical PDCCH. For both RLM and beam monitoring, there are two options:

- The RS is not reconfigured in the UE as it moves: the NW transparently updates the Tx beam of the RS. This would require a CSI-RS, which DL beam can be dynamically updated.
- The UE derives the RS from the active TCI state of the CORESET(s): as the UE moves, different TCI states are activated for the CORESET(s), leading to an implicit update of the RSs used for RLM and beam monitoring.

As previously described, BFR is basically triggered when certain conditions are fulfilled. The configuration of BFR, is very similar to a RACH configuration.

The BeamFailureRecoveryConfig IE is used to configure the UE with RACH resources and candidate beams for beam failure recovery in case of beam failure detection. See also 3GPP TS 38.321, clause 5.1.1. The BeamFailureRecoveryConfig information element and its field descriptions are specified in 3GPP TS 38.331, section 6.3.2.

There currently exist certain challenge(s). One problem is the lack of observability in the network handling the function to be optimized provided in the existing MRO solutions in LTE if applied to NR. That comes from new issues that may occur in NR such as: misconfiguration of RLM, misconfiguration of cell quality derivation and beam reporting parameters, misconfiguration of beam failure detection and beam recovery and, in more general terms, the effects of beam-based monitoring (i.e., based on beam measurements) in NR in different procedures.

Another problem is the misconfiguration of RLM. Differently from LTE, RLM is a highly configurable procedure in NR. First, the network may choose between two different RLM mechanisms (i.e., either explicit configuration of RSs to be monitored (i.e., downlink beams to be monitored, and RS resources signals, like SSBs and/or CSI-RSs), or an implicit configuration based on TCI states and QCLs RSs according to the UE's CORESET configuration(s)), which in turn have their own configuration. Other different parameters are also configurable, regardless of the method above, such as the BLER threshold for the generation of OOS and IS indication from L1 to upper layers so that RLF may be triggered when a radio link problem is detected.

Another problem is the lack of observability when an RLF is triggered due to a problem related to a misconfigured RLM functionality such as the usage of a method not suitable for some scenarios (e.g., network uses a TCI state based method, while it could have used an explicit configuration of RSs, the network has configured too few RLM resources to save UE power, and/or network has configured too many RLM resources unnecessarily and not matching the PDCCH coverage, etc.).

As RLF aims to counter-act failed mobility decisions, RLM shall detect issues in the serving cell when L1 does not perform mobility properly. However, with an RLM misconfiguration the opposite may occur: the UE may have a very good cell coverage (e.g., because cell quality is derived from its whole cell set of SSBs and best beams/SSB is quite good), but, if the proper resources are not configured for RLM (e.g., because beam management is not operating as expected), the UE may not trigger measurement reports (and network may not trigger handovers, because serving cell is actually good), but the UE may trigger RLF. In other words, there may be an RLF even if the UE is still under cell coverage if RLM is not properly configured.

This could be referred to as a new MRO type of problem, such as an RLF from a good cell or sort of a too early RLF. FIG. 7 illustrates an example of such a scenario.

Currently, for MRO problems, the network may be assisted by an RLF report, where the UE logs information at the moment the failure has occurred and a cause value (i.e., what has caused the failure), which may include measurements performed for RRM purposes.

One information that is logged is the RRM measurements performed at the serving cell (and neighbour cells). That allows the source receiving that report to understand the serving cell quality compared to the neighbors and how it could later adjust its settings so that under certain conditions a measurement report would have been triggered. However, with the new RLM scheme in NR only informing latest RRM measurements when the failure occurred (e.g., serving cell quality) does not reveal at all failures that may be caused by misconfigured RLM parameters e.g. RLM resources.

Still another problem is the misconfiguration of Cell Quality Derivation (CQD) and beam reporting parameters. One difference in NR compared to LTE is the possible usage of different reference signals (SSBs and/or CSI-RSs) for handover decisions (while in LTE only cell-specific reference signals are used for cell quality derivation). Also, the way the UE computes cell quality in NR (Cell Quality derivation procedure) is quite configurable.

In NR, these reference signals for CQD are transmitted in different beams and when more than one beam is used for the transmission of these reference signals, the UE receives these reference signals in different time instances. There are also other parameters as in LTE, but possibly configurable per beam (e.g. filter parameters). In RRC, cell quality derivation is described in Section 5.3.3 of 3GPP 38.331.

FIG. 8 illustrates an example where a coverage of cell-A is identified based on the coverage area of SSB beams A1 and A2 a coverage area of a cell-B is identified based on the coverage area of SSB beams B1, B2 and B3. When the UE computes the cell quality of these cells, then the UE needs to consider the additional configuration as to how to combine these beam level measurements into a cell level measurement. This is captured in the section 5.5.3.3 of the NR RRC specification, as shown above. As disclosed, the cell quality can be derived either based on the strongest beam or based on the average of up to 'X' strongest beams that are above a threshold 'T'. These options were introduced to prevent potential ping-pong handover related issues that can arise when only the strongest beam is used for cell quality derivation. It was also discussed that having an averaging based configuration can result in a UE being in a sub optimal cell due to the process of averaging. In the end, both options were supported stating that the network can configure the UE with any of these options depending on which option suits best in terms of the radio condition within the cell's coverage area. Therefore, depending how CQD parameter are set, measurement reports may be triggered later or earlier. Triggering too early may lead to too early or pingo-pong handover, while triggering too late may lead to RLF.

Notice also that beam reporting based on L3 filtered beam measurements in connected mode has also been introduced to possibly improve ping-pong handover rate, especially if one trigger measurement reports on best beam quality. In other words, the network would benefit in getting early measurement reports based on best beam cell quality, but also knowing the quality of individual beams (e.g., SSBs and/or CSI-RS) in neighbour cells before taking mobility decisions. For example, a good candidate may be the one with very good best beam, but also where multiple other beams may be detected (known thanks to the reported information). On the other hand, beam report may not always be activated. Hence, the mistuning of beam reporting parameters (together with the mistuning of CQD parameters) may lead to either a solution where the UE unnecessarily has more efforts (in case beam reporting is activated) and larger measurement reports needs to be transmitted; or the network lacks beam observability to take handover decisions. Thus, the current MRO solution, which is only based on existing measurements, is not suitable to solve these potential issues. Beam reporting parameters may be number of beams to report (e.g. per cell), thresholds for beam reporting, reporting quantities per beam, etc.

Still another problem is the misconfiguration of Beam Failure Detection and Beam Recovery. In LTE, a RACH failure indicated from lower layers may trigger RLF. The baseline solution for MRO assistance is an indication in the RLF report that RLF was triggered due to RACH failure. However, as described above, for NR, random access is used when beam failure detection is triggered, in a procedure called BFR. Before that is triggered the UE is monitoring a set of configured RLM/BFD resource and, when a condition is fulfilled the UE triggers BFR, which consists of a flavor of random access, where the network needs to configure a set of RSs (i.e., a set of beams) that the UE may select before mapping to a RACH resource and send the preamble.

RACH failure due to BFR happens when the UE reaches the maximum number of RACH attempts, but many things depending on configurable parameters, contention, etc. Only knowing that RACH failure occurred limits quite a lot the root cause analyses possibilities on the network side (i.e., limited observability).

Examples of misconfigurations related to BFD and BR may be the resource for BFD, its relation to RLM resources, or the resources for candidate beams when BFR is triggered. In the case of misconfigured candidate beams resource, upon BFD, the UE starts to search on a configured candidate set and may not find a candidate beam in the configured set, which would lead to an RLF. However, it might be the case that the UE is still under cell coverage (i.e. CQD of serving cell is still quite good and measurement reports/mobility is not triggered by the network), something that would be quite bad.

SUMMARY

Certain aspects of the present disclosure and their embodiments may provide solutions to these or other challenges. For example, certain embodiments may advantageously provide methods for Mobility Robustness Optimization.

According to certain embodiments, a method performed by a wireless device includes, in response to detecting a radio link failure (RLF) at the wireless device, logging information related to radio link monitoring resources. In response to re-establishment after the RLF, the wireless device reports at least a portion of the logged information to a network node.

According to certain embodiments, a method performed by a network node includes receiving, from a wireless device, in response to re-establishment of the wireless device after RLF, a report including information logged by the wireless device in response to detecting the RLF.

According to certain embodiments, a wireless device includes processing circuitry configured to, in response to detecting a RLF at the wireless device, log information related to radio link monitoring resources. In response to re-establishment after the RLF, the processing circuitry reports at least a portion of the logged information to a network node.

According to certain embodiments, a network node includes processing circuitry configured to receive, from a wireless device, in response to re-establishment of the wireless device after RLF, a report including information logged by the wireless device in response to detecting the RLF.

Certain embodiments may provide one or more of the following technical advantage(s). For example, certain embodiments may provide for fine tuning of RLM/Beam Failure Detection (BFD)-Beam Failure Recovery (BFR), which may advantageously reduce the network overhead as the network can find the "optimal" BFD/BFR resources to reduce the RLF declaration from the user equipment (UE), thus reducing the UE interruption times due to RLFs along with ensuring optimum beams for cell quality derivation, dedicated Radio Access Channel (RACH) resource allocation and beam configuration for handovers. As another example, certain embodiments may advantageously reduce the computational overhead of the UE and resources to be used for frequent RLM/BFD-BFR related procedures.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
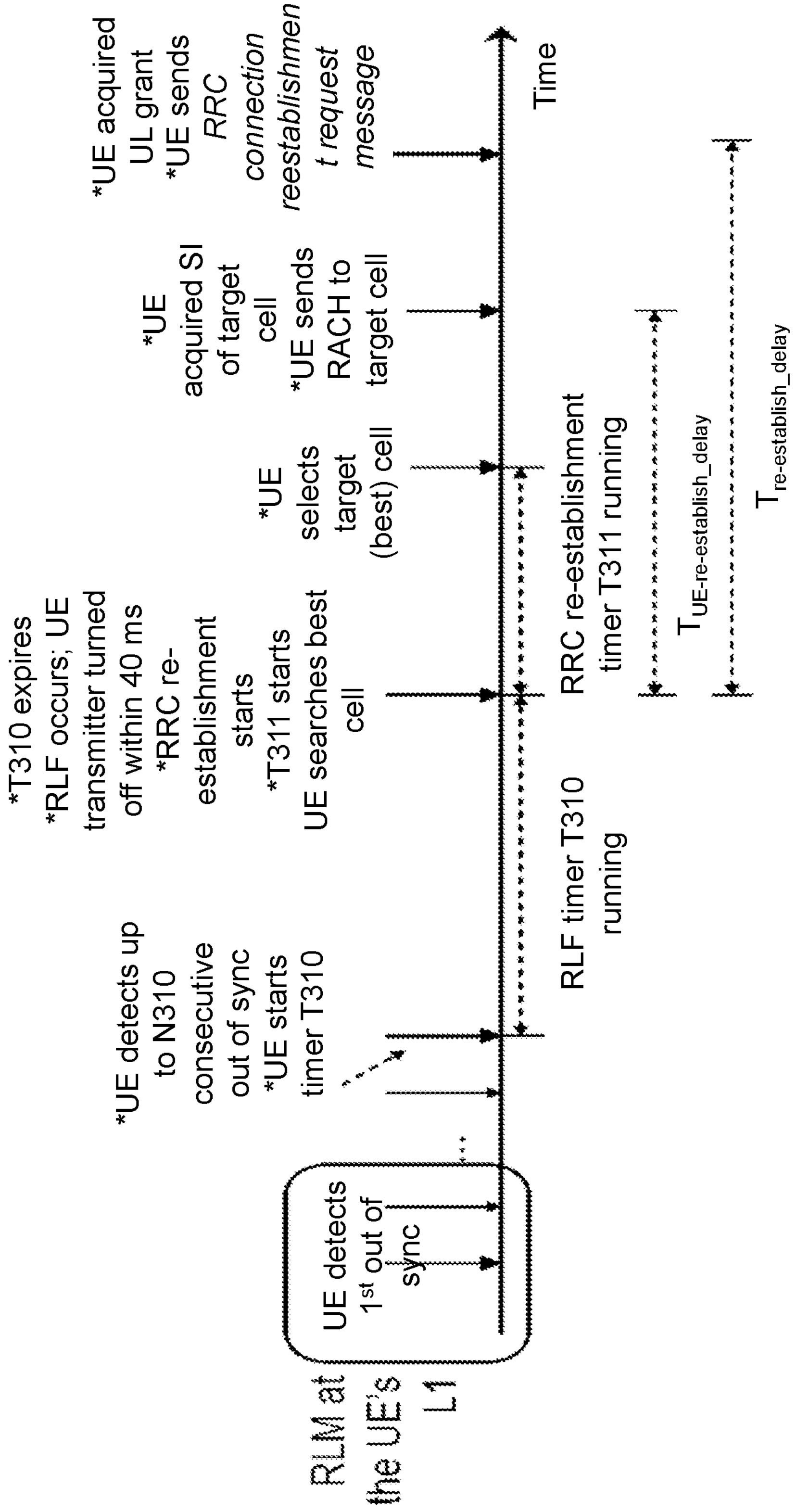
FIG. 1 illustrates an example of higher layer Radio Link Failure (RLF) related procedures in LTE.
Figure 2:
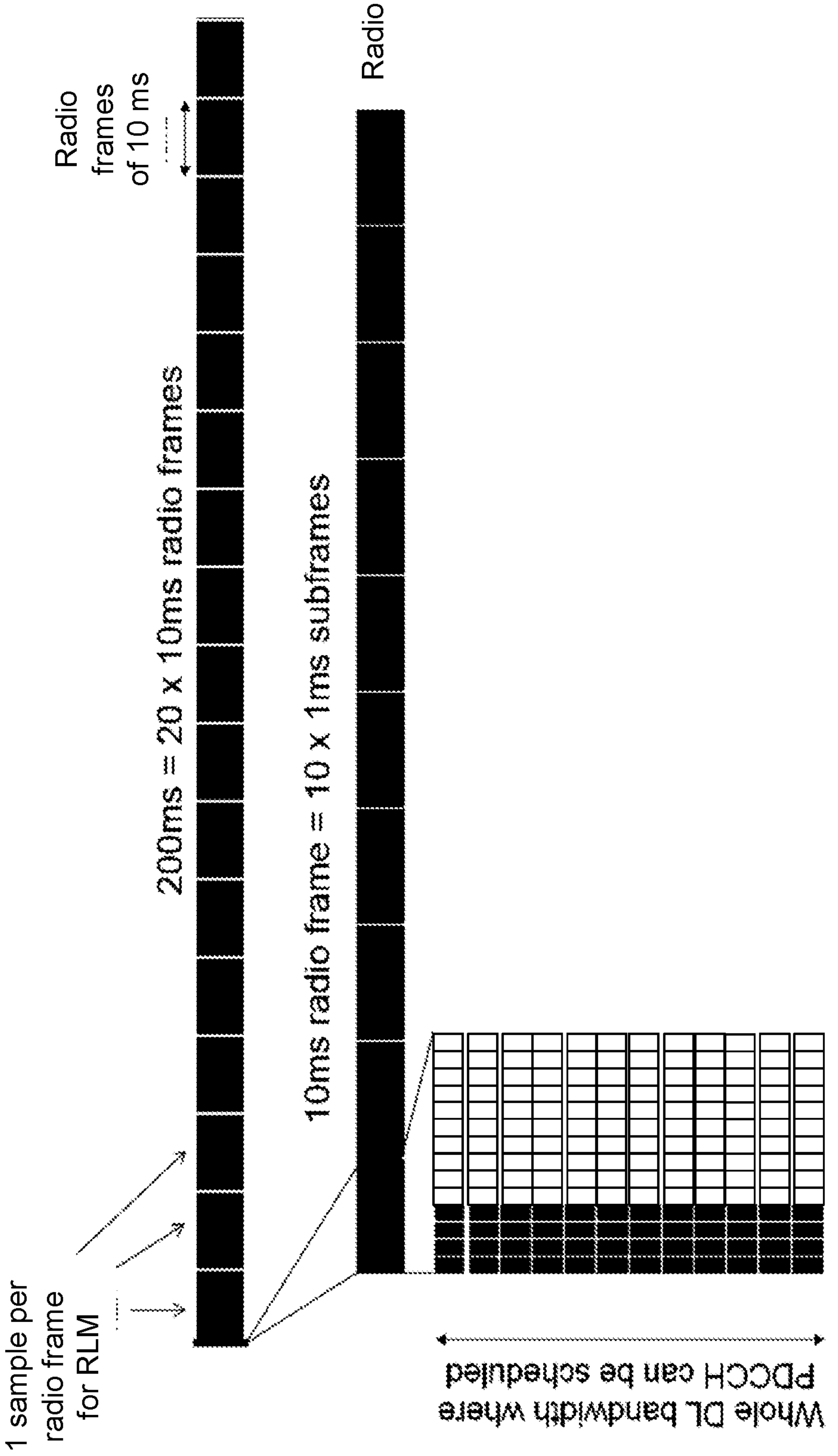
FIG. 2 that Physical Downlink Control Channel (PDCCH) can be scheduled anywhere over the whole downlink transmission bandwidth.
Figure 3:
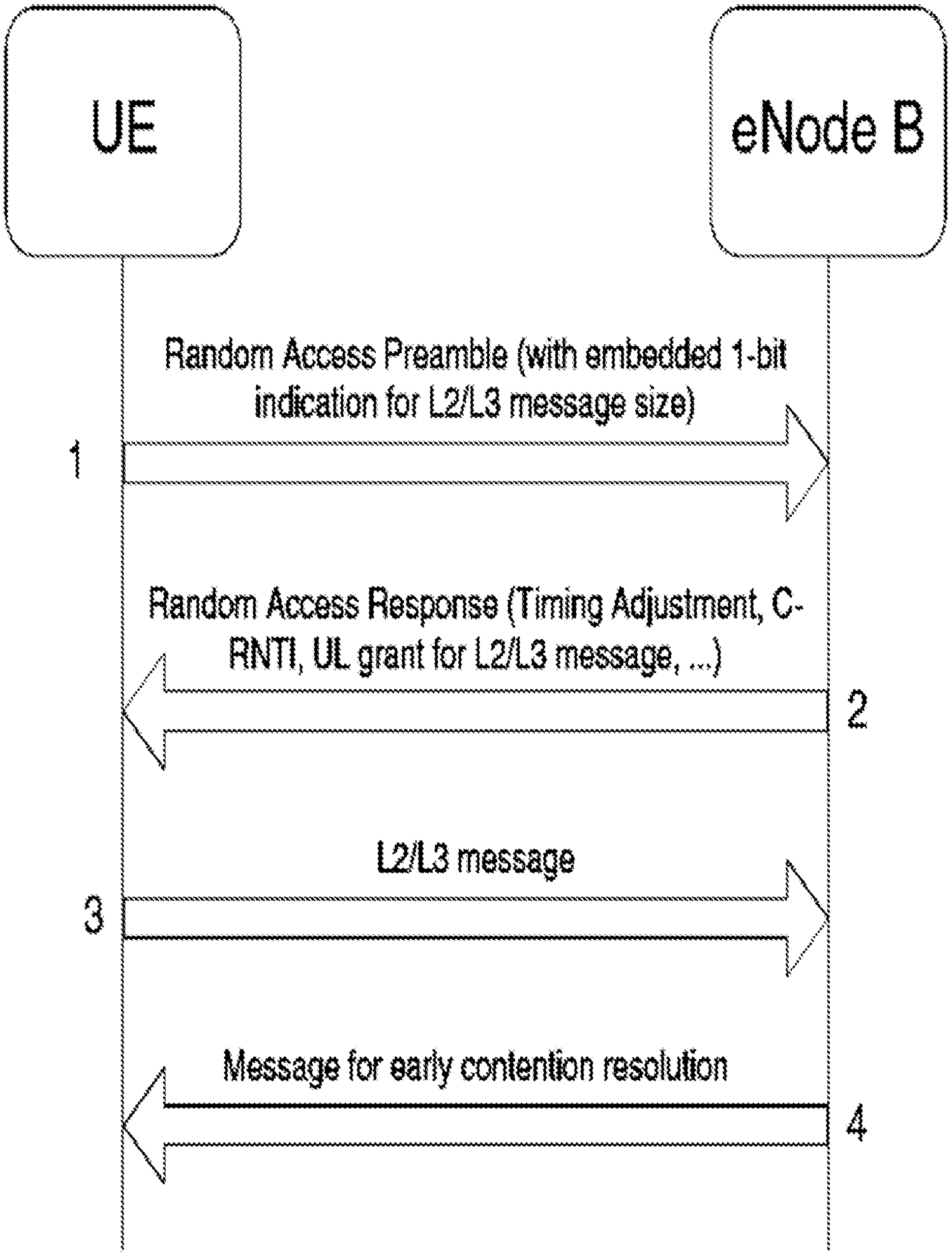
FIG. 3 illustrates an example of a Contention-Based Random Access (CBRA) procedure.
Figure 4A:
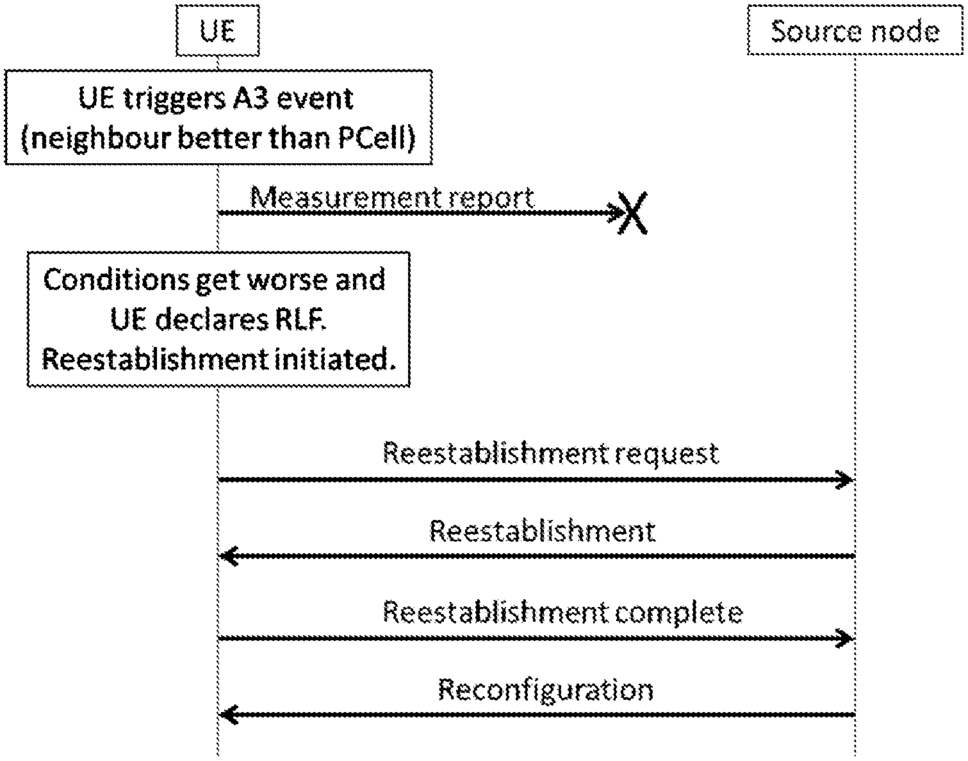
FIGS. 4A and 4B illustrates the two possible cases for handover.
Figure 4B:
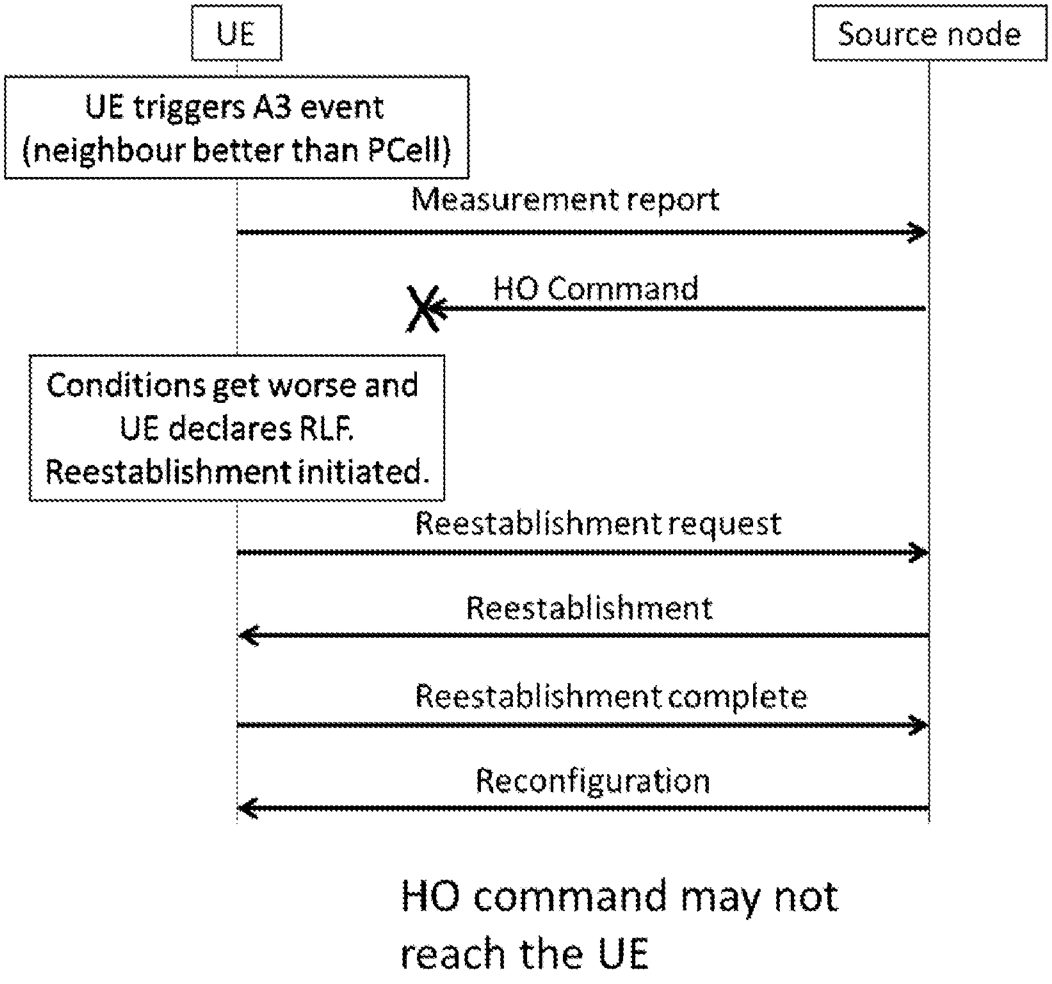
Figure 5:
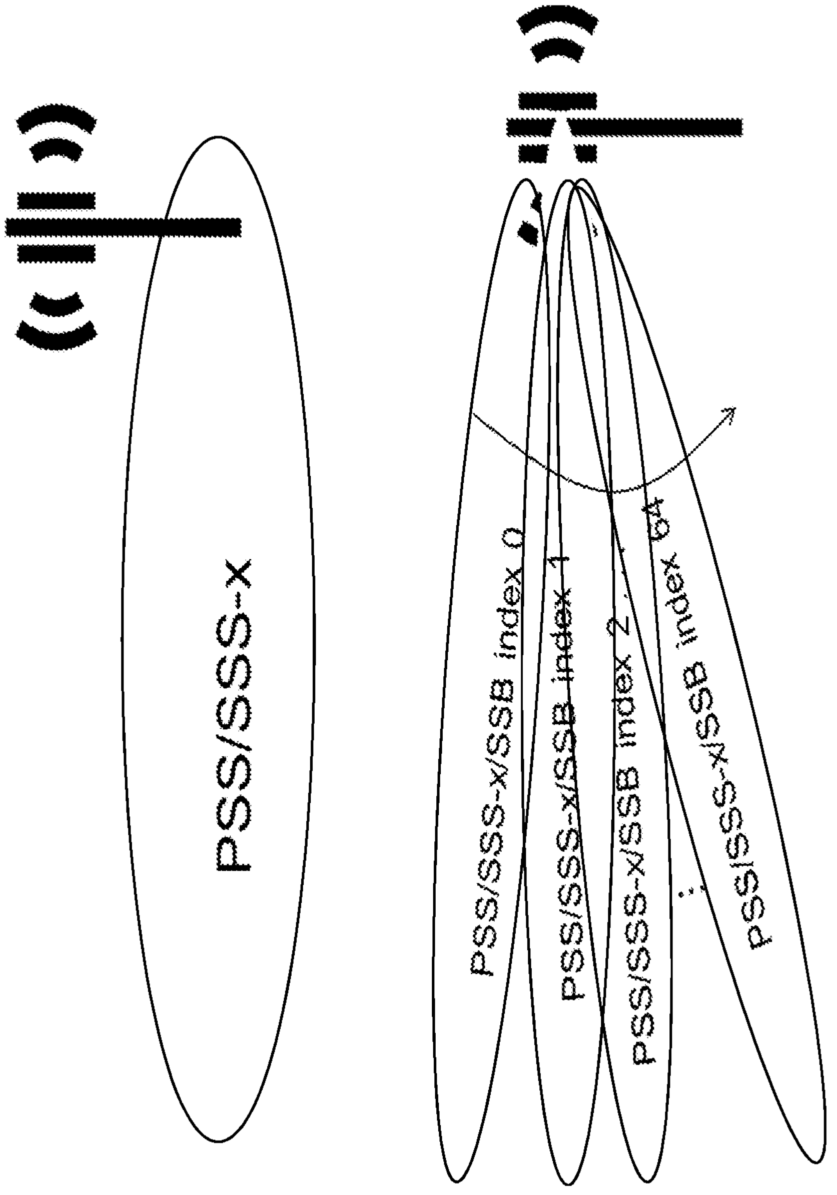
FIG. 5 illustrates an example transmission of Synchronization Signal Block (SSB)
Figure 6:
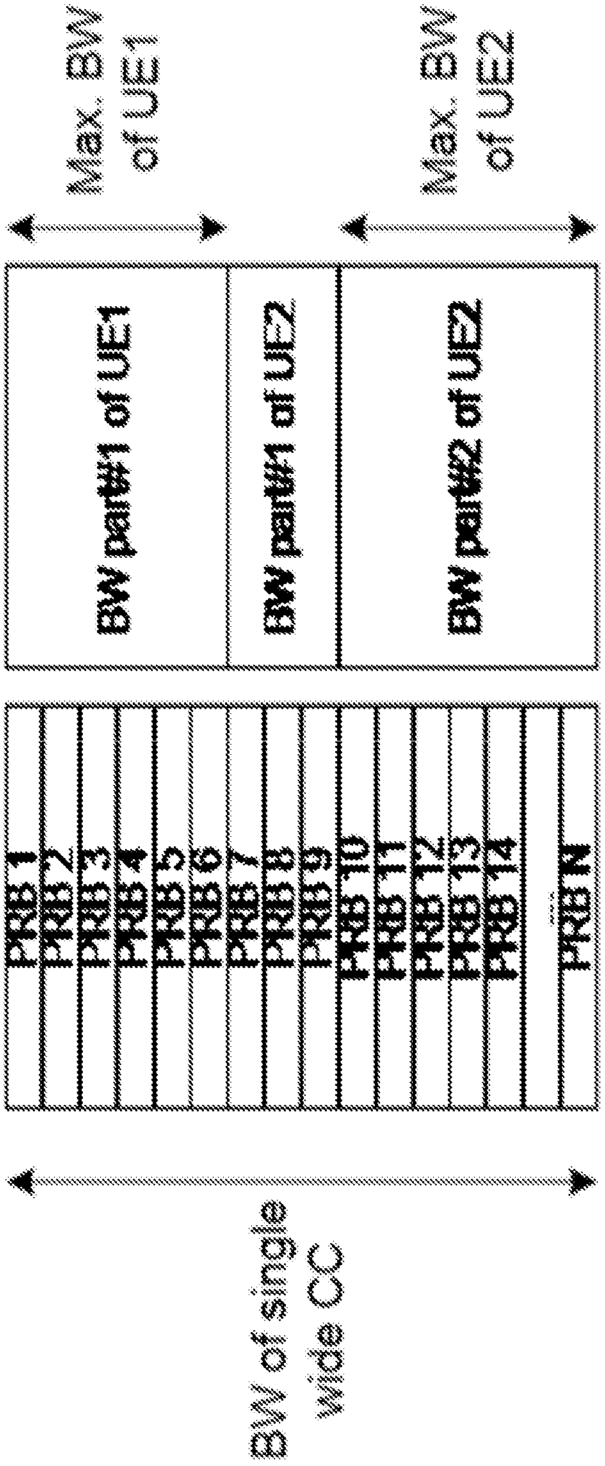
FIG. 6 illustrates bandwidth (BW) of a single wide Component Carrier (CC)
Figure 7:
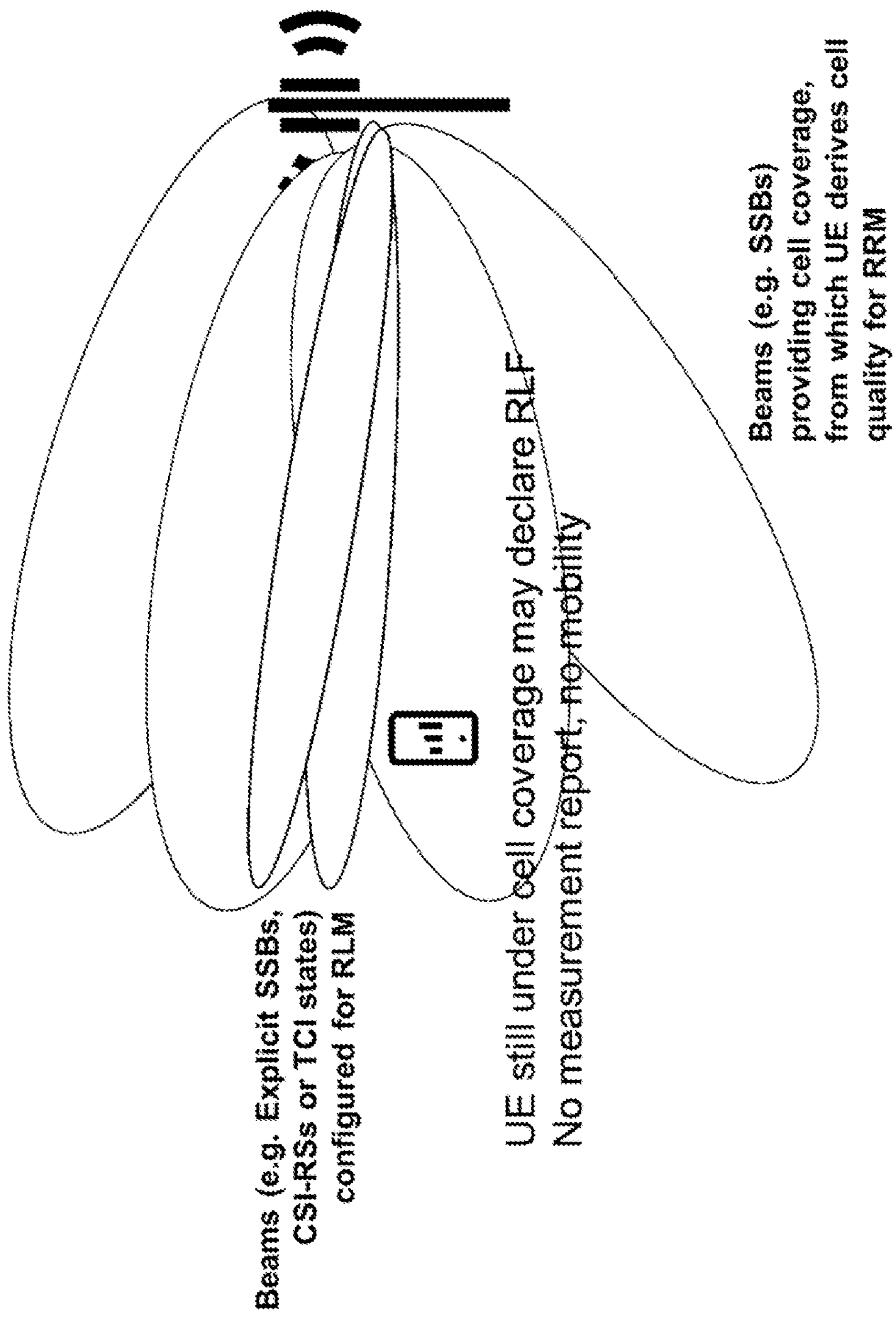
FIG. 7 illustrates a new Mobility Robustness Optimization (MRO) type of problem such as an occurrence of RLF from a good cell or a too early RLF.
Figure 8:
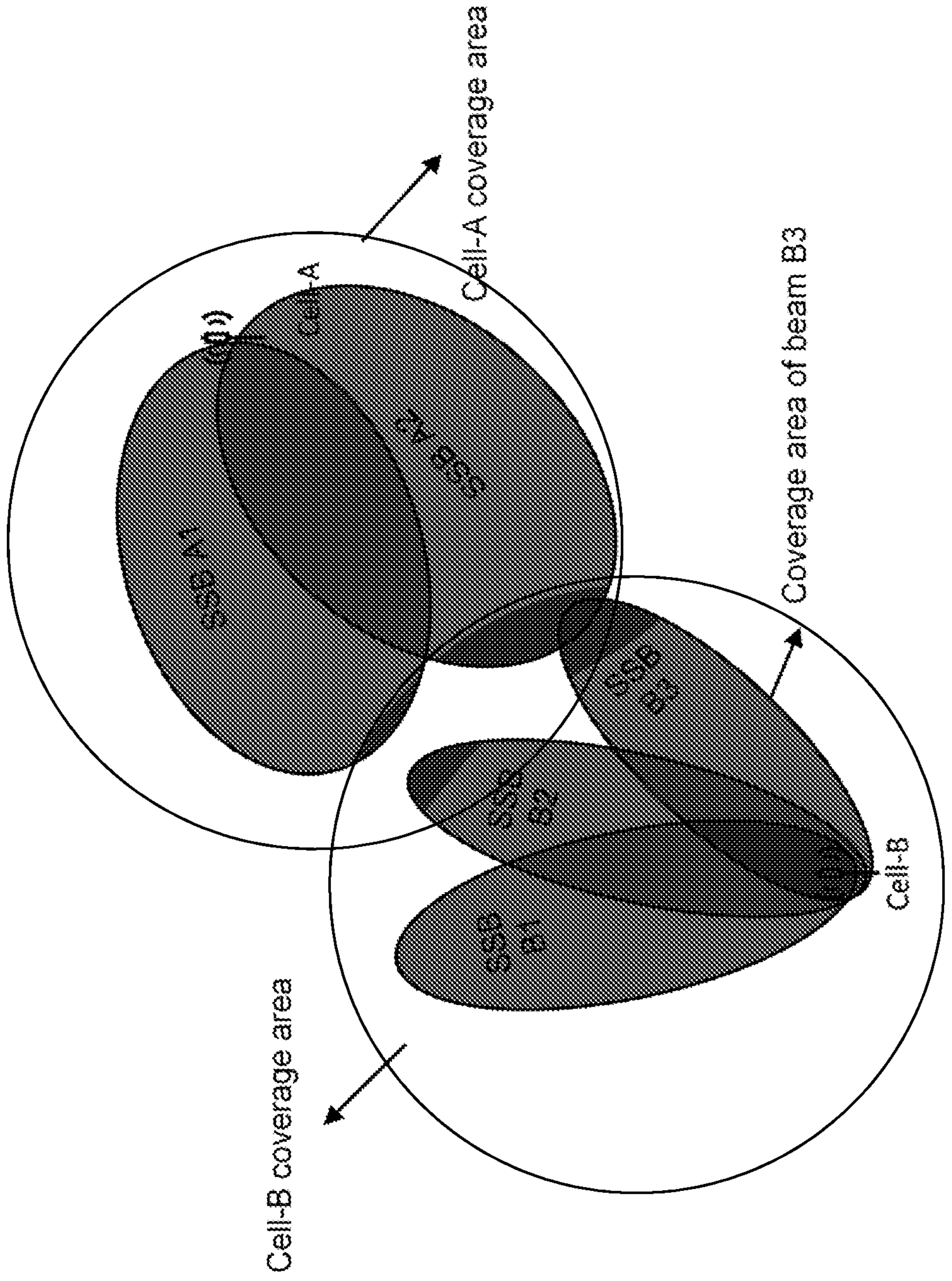
FIG. 8 illustrates an example where a coverage of cell-A is identified based on the coverage area of Synchronization Signal Block (SSB) beams A1 and A2 a coverage area of a cell-B is identified based on the coverage area of SSB beams B1, B2 and B3.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

According to certain embodiments, a method performed by a wireless terminal such a user equipment (UE) for Mobility Robustness Optimization (MRO) assistance is disclosed. In certain embodiments, the method includes:

- Upon (or in response to) the detection of Radio Link Failure (RLF) at the UE due to the expiry of timer T310, logging/storing one or more of the following information:
  - If beam failure has been detected, an indication for the detection of a beam failure (e.g., a Beam Failure Detection (BFD) flag or event), possibly including additional state information when the BFD(s) occur such as beam measurement information on resources that were being monitored when the failure has been detected. In certain embodiments, that may also include beam measurement information on other resources that are not the ones being monitored for that purpose (e.g., serving cell measurements on other beams) so that upon reporting the network may know, for example, which other good beams were covering the UE when the failure was detected;
  - Beam measurement information of serving cell(s) on reference signals (RS) the UE is monitoring for RLM or BFD (e.g., Reference Signals (RSs) for Transmission Configuration Indicator (TCI) states, explicitly configured Synchronization Signal Blocks (SSBs), explicitly configured Channel State Information-Reference Signals (CSI-RSs), etc.);
  - Beam measurement information of neighboring cell(s) on RSs the UE is monitoring for RLM or BFD (e.g., RSs for TCI states, explicitly configured SSBs, explicitly configured CSI-RSs, etc.);
  - Beam measurement information of serving cell(s) on reference signals (RS) the UE is monitoring for Radio Resource Management (RRM) (i.e., configured for measurement reporting) such as available measurement per SSBs and/or CSI-RSs;
  - Beam measurement information of neighbour cell(s) on reference signals (RS) the UE is monitoring for RRM (i.e., configured for measurement reporting) such as available measurement per SSBs and/or CSI-RSs;
- Upon (or in response to) the detection of RLF due to indication from Medium Access Control (MAC) of a Random Access Channel (RACH) failure (e.g., due to the UE reaching the maximum number of RACH attempts), logging/storing information related to at least one of the following procedures:
  - If beam failure has been detected, an indication for the detection of a beam failure (e.g., a BFD flag or event), possibly including additional state information when the BFD(s) occur such as beam measurement information on resources that were being monitored when the failure has been detected. In certain embodiments, that may also include beam measurement information on other resources that are not the ones being monitored for that purpose (e.g., serving cell measurements on other beams) so that upon reporting the network may know, for example, which other good beams were covering the UE when the failure was detected;
  - If beam failure recovery (BFR) has been triggered, an indication that beam failure recovery has been triggered (e.g., due to BFD), possibly including additional state information when the BFR occurs such as beam measurement information on resources/beam that were selected when BFR is triggered, for each RACH attempt. In certain embodiments, that may also include beam measurement information on other resources that are not the ones configured as candidate beams/Resources for BFR (e.g., serving cell measurements on other beams) so that upon reporting the network may know, for example, which other good beams were covering the UE when the failure was detected and when the UE has to select candidate beams;
  - Beam measurement information of serving cell(s) on reference signals (RS) the UE is monitoring for RLM or BFD (e.g., RSs for TCI states, explicitly configured SSBs, explicitly configured CSI-RSs, etc.);
  - Beam measurement information of neighboring cell(s) on RSs the UE is monitoring for RLM or BFD (e.g., RSs for TCI states, explicitly configured SSBs, explicitly configured CSI-RSs, etc.);
  - Beam measurement information of serving cell(s) on reference signals (RS) the UE is monitoring for RRM (i.e., configured for measurement reporting) such as available measurement per SSBs and/or CSI-RSs;
  - Beam measurement information of neighbour cell(s) on reference signals (RS) the UE is monitoring for RRM (i.e., configured for measurement reporting) such as available measurement per SSBs and/or CSI-RSs;
  - Even information for the different preamble retransmissions from the first to the last that reached the maximum number of attempts, such as:
    - Beam measurement information on each attempt (e.g., for selected beams);
    - The occurrence of beam selection in each attempt or power ramping on the same beam;
    - Detection of contention for a given selected beam;
- Upon (or in response to) re-establishment after an RLF, and after logging failure information as described above, reporting to the network at least one of the information described above;
  - In certain embodiments, the UE may include in the Reestablishment Complete message (or an RRC Reconfiguration Complete message) at least one indication that the UE has any of the failure information available;

In certain embodiments, upon (or in response to) transmitting that to the network, the network detects that the UE has that information available and requests the UE to report this information (e.g., with a UEInformationRequest message including a flag indicating that the UE shall report a specific failure information.

In certain embodiments, upon (or in response to) receiving that request (e.g., UEInformationRequest), the UE may report the information to the network (e.g., in a UEInformationResponse message including an RLF report including at least one of the information described above.

Thus, in certain embodiments, when collecting the RLF report when RLF happens (due to RLM), the UE may collect/report one or more of the following measurement/information:

- Logging information related to radio-link monitoring (RLM) on a serving cell (where RLF is detected);
- Logging information related to beam failure recovery (BFR) on a serving cell (where RLF is detected);
- Logging RRM measurements per beam on a serving cell (where RLF is detected);
- Logging RRM measurements per beam on at least one neighbor cell such as measurements performed on beams for cell quality derivation; and
- Logging information related to the RACH process behavior used for BFR (e.g., trace of the selected beams and number of attempts per beam).

Figure 9:
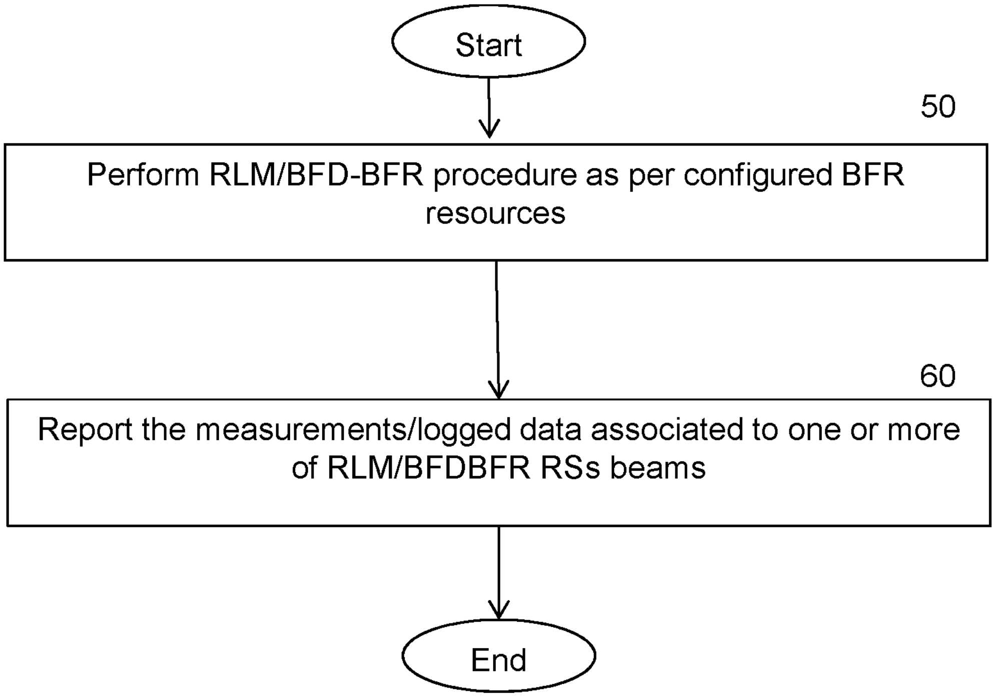
FIG. 9 illustrates a flow chart of an embodiment for UE reporting after Radio Link Monitoring (RLM) or after a failed or a successful Beam Failure Recover (BFR), according to certain embodiments.

FIG. 9 illustrates a flow chart of an embodiment for UE reporting after RLM or after a failed or a successful BFR, according to certain embodiments. At step 50, the UE performs RLM/BFD-BFR procedures as per configured BFR resources. At step 60, the UE reports the measurements/logged data associated to one or more of RLM/BFDBFR RSs beams.

According to certain other embodiments, a method at the UE for RLF reporting is disclosed and may include:

- Logging information related to radio-link monitoring (RLM) on a serving cell (where RLF is detected), such as measurements performed on resources configured for RLM, such as beam measurements. In certain embodiments, these resources may be reference signals (RS) that may be beamformed such as SSB resources, CSI-RS resources, CSI-RS resources associated to TCI states, SSB resources associated to TCI states that were configured for RLM;
  - In certain embodiments, the measurements to be logged may be one or more of RSRP, RSRQ, SINR, Qout, Qin, etc.
  - In certain embodiments, the measurements to be logged may be Qin and/or Qout indications per resource;
  - In certain embodiments, other data to be logged may include RLM related timers such as T310, T312, etc.
- Logging information related to beam failure detection (BFD) on a serving cell (where RLF is detected) such as measurements performed on resources configured for BFD, such as beam measurements. In certain embodiments, these resources may be reference signals (RS) that may be beamformed such as SSB resources, CSI-RS resources, CSI-RS resources associated to TCI states, SSB resources associated to TCI states that were configured for BFD;
  - In certain embodiments, the measurements to be logged may be one or more of RSRP, RSRQ, SINR, Qout, Qin, etc.
  - In certain embodiments, measurements to be logged may be Qin and/or Qout indications per resource, and the current state of the related counters.
- Logging information related to BFR on a serving cell (where RLF is detected) such as measurements performed on candidate resources for selection when beam failure detected, configured for BFR, such as beam measurements. In certain embodiments, measurement on resources not listed in the candidate beam-resources list while the UE hears them in a very good quality or with a quality above a certain beam suitability threshold. In certain embodiments, these resources may be reference signals (RS) that may be beamformed such as SSB resources, CSI-RS resources, CSI-RS resources associated to TCI states, SSB resources associated to TCI states, TRS, Demodulation Reference Signals (DMRS) or any combination of these signals that were configured for BFD;
  - In certain embodiments, the measurements to be logged may be one or more of RSRP, RSRQ, SINR, Qout, Qin, etc.
  - In certain embodiments, the measurements to be logged may be Qin and/or Qout indications per resource;
  - In certain embodiments, these measurements may be one or more of RSRP, RSRQ, SNR, Qout, Qin, etc.
- Logging RRM measurements per beam on a serving cell (where RLF is detected) such as measurements performed on beams for cell quality derivation. In certain embodiments, these beams may be reference signals (RS) that may be beamformed such as SSB resources, CSI-RS resources, TRS, DMRS or any combination of these signals;
  - In certain embodiments, the measurements to be logged may be one or more of RSRP, RSRQ, SINR.
- Logging RRM measurements per beam on at least one neighbor cell such as measurements performed on beams for cell quality derivation. In certain embodiments, these beams may be reference signals (RS) that may be beamformed such as SSB resources, CSI-RS resources, TRS, DMRS or any combination of these signals;
  - In certain embodiments, measurements to be logged may be one or more of RSRP, RSRQ, SINR.
- Logging RRM measurements per beam on a cell the UE selects and performs reestablishment after RLF, such as measurements performed on beams for cell quality derivation (for cell selection) or for beam selection upon random access resource selection. These beams may be reference signals (RS) that may be beamformed such as SSB resources, CSI-RS resources, TRS, DMRS or any combination of these signals;
  - Measurements to be logged may be at least RSRP, RSRQ,
- Reporting any of the information described above related to RLM, BFD, BFR, etc.

In certain embodiments, the UE may include the sensor measured data in the report, such as (for example) UE orientation/altitude to log in addition to location, speed and heading (e.g., digital compass, gyroscope as well as barometer and etc.).

In certain embodiments, the UE may include its speed state (e.g., low, mid, high) configured for example as part of speed-based scaling procedure. According to certain embodiments, assistance information reported by the UE in, for example, an RLF report included in a UEInformation-Response message and forwarded to the DU where the failure has been originated may be used to optimize RLM parameters. According to certain embodiments, these parameters may be one or more of the following:

RadioLinkMonitoringConfig information element

```
-- ASN1START
-- TAG-RADIOLINKMONITORINGCONFIG-START
RadioLinkMonitoringConfig ::=                    SEQUENCE {
    failureDetectionResourcesToAddModList            SEQUENCE
(SIZE(1..maxNrofFailureDetectionResources))  OF  RadioLinkMonitoringRS
OPTIONAL, -- Need N
    failureDetectionResourcesToReleaseList           SEQUENCE
(SIZE(1..maxNrofFailureDetectionResources)) OF RadioLinkMonitoringRS-Id
OPTIONAL, -- Need N
    beamFailureInstanceMaxCount                      ENUMERATED {n1, n2, n3, n4, n5,
n6, n8, n10}                     OPTIONAL, -- Need R
    beamFailureDetectionTimer                      ENUMERATED {pbfd1, pbfd2, pbfd3,
pbfd4, pbfd5, pbfd6, pbfd8, pbfd10}              OPTIONAL, -- Need R
    ...
}
RadioLinkMonitoringRS ::=                        SEQUENCE {
    radioLinkMonitoringRS-Id
    purpose                          ENUMERATED {beamFailure, rlf, both},
    detectionResource                      CHOICE {
        ssb-Index                      SSB-Index,
        csi-RS-Index                           NZP-CSI-RS-ResourceId
    },
        ...
}
--TAG-RADIOLINKMONITORINGCONFIG-STOP
--ASN1STOP
```

beamFailureDetectionTimer: This is the timer for beam failure detection as defined in TS 38.321, clause 5.17. The value is in number of "$Q_{out,LR}$ reporting periods of Beam Failure Detection" Reference Signal. Value pbfd1 corresponds to 1 $Q_{out,LR}$ reporting period of Beam Failure Detection Reference Signal, value pbfd2 corresponds to 2 $Q_{out,LR}$ reporting periods of Beam Failure Detection Reference Signal and so on.

The usage of the timer is described in the MAC specifications as follows:

```
The MAC entity shall:
    1> if beam failure instance indication has been received from lower
        layers:
        2> start or restart the beamFailureDetectionTimer;
        2> increment BFI_COUNTER by 1;
        2> if BFI_COUNTER >= beamFailureInstanceMaxCount:3>
            initiate a Random Access procedure (see subclause 5.1) on the
            SpCell.
    1> if the beamFailureDetectionTimer expires; or
    1> if beamFailureDetectionTimer, beamFailureInstanceMaxCount, or
        any of the reference signals used for beam failure detection is
        reconfigured by upper layers:
        2> set BFI_COUNTER to 0.
    1> if the Random Access procedure is successfully completed (see
        subclause 5.1):
        2> set BFI_COUNTER to 0;2> stop   the
            beamFailureRecoveryTimer, if configured;
        2> consider the Beam Failure Recovery procedure successfully
            completed.
```

This may be considered equivalent to the in-sync (IS) indications in RLF handling that indicates that after the reception of an out-of-sync (OSS) event the link is getting recovered. In BFD, the absence of an OOS indication is somehow an indication that beam(s) monitored are getting better and beam recovery shall not be triggered.

According to certain embodiments, if the timer is too short (e.g., a single OSS event received), the UE may trigger BFR upon a single OOS event. That may possibly be due to fast fading effect and, network may not really want the UE to trigger BFR (i.e. random access) every time it happens, since that might be fixed by the network via ordinary beam management procedures. The consequence of a too short timer value is a higher than necessary number of BFR attempts, which may lead to RLF due to the maximum number of retransmissions in RACH being reached.

According to certain other embodiments, if the timer is too long, for example BFR is only triggered when a high number of OOS events come in a quite short window, there could be a misdetection of problems if here and there the link gets recovered (and OOS events are absent just sometimes), which may possibly happen due to fast fading effect. Hence, BFR may not be triggered, even when needed, even though RLM may anyway trigger RLF, depending how the RLF parameters for the IS and OSS counter thresholds are set.

According to certain of the embodiments described herein, information regarding OSS events for BFD and RLM and beam measurements on reference signals configured for RLM may assist the network to either increase the timer value when too many BFRs are happening (e.g. based on collected statistics from one or multiple UEs). That may be known thanks to the reported assistance information (e.g., RLF report) containing information that RACH failure occurred due to BFR being triggered and reaching a maximum number of retransmissions.

The beamFailureInstanceMaxCount field determines after how many beam failure events the UE triggers beam failure recovery (see TS 38.321, clause 5.17). Value n1 corresponds to 1 beam failure instance, n2 corresponds to 2 beam failure instances and so on. This is basically the number of OOS events within the time window that triggers BFR.

If this value is too low, there may be too many BFRs triggered due to a fast fading event and/or blocking, which will trigger the UE to perform random access and possibly lead to RLF if maximum number of attempts is reached. Notice that the risk here is to trigger BFR due to a fast fading and/or blockage effect that may likely be recovered anyway. The content of RLF report including beam measurements on BFD resources (and event measurements beyond that) may assist the network to understand that too many BFRs may be happening due to too low values for this counter.

Else, if this value is too high, UE may not trigger BFRs even though the situation is not very good.

The risk is that RLM is being performed anyway and RLF is triggered, even though there is still some good coverage in the cell that was not really detected since UE has not triggered BFR and has not had the chance to find a candidate beam, assuming a correct configuration of candidate beams. Thus, too high value may lead to too late BFR.

The reported information in the RLF report may assist the network to detect RLF due to RACH failure (maximum number of retransmissions) due to too many BFR attempts, possibly due to a too low value of the counter. Or, RLF due to expiry of timer T310 due to the fact BFR is not being triggered (or is slower than RLF) due to the fact that the counter is set too high.

The failureDetectionResourcesToAddModList field is a list of reference signals for detecting beam failure and/or cell level radio link failure (RLF). The limits of the reference signals that the network can configure are specified in 3GPP TS 38.213, in Table 5-1. The network configures at most two detectionResources per BWP for the purpose "beamFailure" or "both". If no RSs are provided for the purpose of beam failure detection, the UE performs beam monitoring based on the activated TCI-State for PDCCH as described in TS 38.213, clause 6. If no RSs are provided in this list for the purpose of RLF detection, the UE performs Cell-RLM based on the activated TCI-State of PDCCH as described in TS 38.213, clause 5. The network ensures that the UE has a suitable set of reference signals for performing cell-RLM.

Basically, this list determines the exact resources for BFD and/or RLM, but also the exact RLM/BFD method to be used (implicitly based on TCI states configurations or explicitly based on RS configurations).

If a UE is configured with sub optimum of RS resources for BFD or RLM, RLF may either be triggered too early or never be triggered. That is especially important in the case the resources monitored for RLM/BFD are not the same ones used for cell quality derivation. In that case, the network may not trigger handovers (because UE does not trigger measurements reports taken based on SSBs, which have good coverage) but triggers RLF due to the expiry of timer T310 due to misconfigured RS resources for RLM, in the sense that they may not really translate that the UE is still under cell coverage (but monitoring resources/beams that are not the best ones covering the UE). Thus, when an RLF happens due to timer T310 and UE logs BFD/RLM information, such as beam measurements of BFD/RLM resources, but possibly other beams from the serving cell (e.g. available SSB measurements, or CSI-RS measurements), the UE basically indicates to the network that the UE was under cell coverage but it was monitoring resources with not so good coverage (hence, RLF happened).

Similar issues may occur in BFR triggered by a misconfiguration of BFD resources. If the network detects RLF due to RACH failure due to too many RACH retransmissions due to too many BFR procedures, it may be a sign of too many BFD events, due to misconfigured BFD resources.

According to certain embodiments, possible network actions based on an enhanced RLF report with information regarding beam measurements on serving cell of BFD/RLM resources, and possibly including beam measurements on serving cell of other resources not configured for BFD/RLM, such as serving cell SSB measurements for RRM, may be taken. For example, the network may know that it should have configured other BFD/RLM resources/beams, and even change the method being used from the one based on TCIs to something that matches the reference signals used for cell quality derivation (e.g., use the same RS and instruct the UE to do RLM/BFD based on SSBs, as in the case of RRM measurements).

Another possible optimization is the activation of BFR itself. It might be the case the network starts its operation without BFR until it starts to detect RLFs and realize that something may be done. For example, when the UE declares RLFs and RLF report indicates that these could be avoided with BFR e.g. the RLF report shows that there were other good beams not configured for RLM that could have been configured as candidate beams for BFR. Thus, based on that information, network activates BFR and knows which beam it may configure as candidate beams.

According to certain embodiments, BFR parameters may be tuned based on assistance information. For example, in certain of the example embodiments disclosed herein, it has been described that assistance information reported by the UE and forwarded to the DU where the failure has been originated may be used to optimize BFR parameters. In certain embodiments, these parameters may be one or more of the following:

BeamFailureRecoveryConfig information element

```
-- ASN1START
-- TAG-BEAM-FAILURE-RECOVERY-CONFIG-START
BeamFailureRecovery Config ::=                    SEQUENCE {
    rootSequenceIndex-BFR                                   INTEGER (0..137)
OPTIONAL, -- Need M
    rach-ConfigBFR                                      RACH-ConfigGeneric
OPTIONAL, -- Need M
    rsrp-ThresholdSSB                                               RSRP-Range
```

-continued

BeamFailureRecoveryConfig information element

```
OPTIONAL, -- Need M
          candidateBeamRSList                                              SEQUENCE
(SIZE(1..maxNrofCandidateBeams))                          OF PRACH-ResourceDedicatedBFR
OPTIONAL, -- Need M
          ssb-perRACH-Occasion                                ENUMERATED {oneEighth, oneFourth,
oneHalf, one, two, four, eight, sixteen}          OPTIONAL, -- Need M
          ra-ssb-OccasionMaskIndex                                INTEGER (0..15)
OPTIONAL, -- Need M
          recoverySearchSpaceId                                            SearchSpaceId
OPTIONAL, -- Cond CF-BFR
          ra-Prioritization                                           RA-Prioritization
OPTIONAL, -- Need R
          beamFailureRecoveryTimer                              ENUMERATED {ms10, ms20, ms40,
ms60, ms80, ms100, ms150, ms200}                         OPTIONAL, -- Need M
          ....
          [[
          msg1-SubcarrierSpacing-v1530                                SubcarrierSpacing
OPTIONAL -- Need M
          ]]
     }
     PRACH-ResourceDedicatedBFR ::=                             CHOICE {
          ssb                                       BFR-SSB-Resource,
          csi-RS                                         BFR-CSIRS-Resource
     }
     BFR-SSB-Resource ::=                                SEQUENCE {
          ssb                                       SSB-Index,
          ra-PreambleIndex                                  INTEGER (0..63),
          ...
     }
     BFR-CSIRS-Resource ::=                                   SEQUENCE {
          csi-RS                                         NZP-CSI-RS-ResourceId,
          ra-OccasionList                                               SEQUENCE (SIZE(1..maxRA-
OccasionsPerCSIRS)) OF INTEGER (0..maxRA-Occasions-1)          OPTIONAL, --
Need R
          ra-PreambleIndex                                     INTEGER (0..63)
OPTIONAL, -- Need R
          ...
}
     -- TAG-BEAM-FAILURE-RECOVERY-CONFIG-STOP
     -- ASN1STOP
```

The beamFailureRecoveryTimer is a timer for beam failure recovery timer that starts when BFR is triggered (i.e. when random access due to BFR is started and stops if things are successful. Upon expiration of the timer the UE does not use CFRA for BFR. Value in ms. ms10 corresponds to 10 ms, ms20 to 20 ms, and so on.

Thus, upon the expiry of the timer, the UE may still perform beam selection for, BFR (i.e., RACH resource selection), but for contention-free random access resources. The longer this timer is the longer the amount of time the UE is allowed to use CFRA. Hence, based on beam measurement information reported in RLF report when RLF happens (e.g., due to RACH failure (due to maximum number of attempts reached)), the network may know what beams the UE has tried to select, for example, whether these were CFRA or CBRA resources and, possibly increase the value of this timer so the UE may take more time to select a CFRA resource. Else, if failure occurs even if that time is set with a quite high value.

The candidateBeamRSList is a list of reference signals, which may include CSI-RS and/or SSB, identifying the candidate beams for recovery and the associated RA parameters. The network configures these reference signals to be within the linked downlink bandwidth part (DL BWP) (i.e., within the DL BWP with the same bwp-Id) of the uplink bandwidth part (UL BWP) in which the BeamFailureRecoveryConfig is provided.

Upon BFD, the UE needs to select one of the configured beams. If upon BFD the UE is under the coverage of beams that are not in the list of these resources, the UE is not able to perform BFR, which may lead to RLF. Hence, RLF report may include beam measurements (e.g., based on SSBs and CSI-RSs) to indicate the network that these resources are possibly misconfigured.

According to certain embodiments, based on these reports, the network may add and/or replace resources in that configuration. For example, if in RLF report the UE indicates the RLF due to expiry of timer T310, even though it indicates that BFD was triggered (e.g., thanks to a flag in RLF report for BFD or other information enabling network to detect that), but no BFR was triggered because the lack of resources, and network also has beam measurements for beams that were not configured as candidate resources, network knows that these reported beams, if providing good measurements (e.g., high RSRP, RSRQ or SNR values), are good to be configured as candidates for beam recovery so that RLF may be avoided next time thanks to the fact that the UE would have an opportunity to select a beam of the cell that is providing good coverage to the UE so the UE can try to perform BFR. Notice that these beams measurements may be RRM measurements based on SSBs.

The msg1-SubcarrierSpacing parameter is a subcarrier spacing for contention free beam failure recovery. Only the values 15 or 30 kHz (<6 GHz), 60 or 120 kHz (>6 GHz) are applicable. See TS 38.211, clause 5.3.2.

The rsrp-ThresholdSSB parameter is a L1-RSRP threshold used for determining whether a candidate beam may be used by the UE to attempt contention free Random Access to recover from beam failure (see TS 38.213, clause 6). By receiving an RLF report including beam measurements at the moment the failure has occurred, the network knows which beams are above or below a threshold. Notice that in this sense, the UE may report beams in RLF report regardless of their quality (i.e., possibly including beams below that threshold). That would allow the network to possibly lower that threshold in case it is set too high.

The ra-prioritization are parameters which apply for prioritized random access procedure for BFR. They may include the following parameters:

- powerRampingStepHighPrioritiy: Power ramping step applied for prioritized random access procedure; This is to be used in case prioritization is used for BFR.
- scalingFactorBI: Scaling factor for the backoff indicator (BI) for the prioritized random access procedure. (see TS 38.321 [3], clause 5.1.4). Value zero corresponds to 0, value dot25 corresponds to 0.25 and so on.

Upon the reception of an RLF report including information that BFR failure has occurred (e.g., maximum number of RACH attempts) and beam measurements when the procedure occurs, the network is able to understand that prioritization of BFR could have make the procedure succeed. Then, upon receiving an RLF report with that information the network may turn on the prioritization feature (i.e., configure UEs with that configuration) and provide parameter accordingly, such as power ramping step high priority and scaling factor.

The ra-ssb-OccasionMaskIndex parameter may be an explicitly signalled PRACH Mask Index for RA Resource selection in 3GPP TS 38.321. The mask is valid for all SSB resources.

The rach-ConfigBFR parameter is the configuration of contention free random access occasions for BFR. If the network receives an RLF report including information that RLF is triggered due to RACH failure, and that this occurred due to BFR and that contention is detected, the network may configure CFRA resources.

The recoverySearchSpaceId parameter is a search space to use for BFR RAR. The network configures this search space to be within the linked DL BWP (i.e., within the DL BWP with the same bwp-Id) of the UL BWP in which the BeamFailureRecoveryConfig is provided. The CORESET associated with the recovery search space cannot be associated with another search space.

The ssb-perRACH-Occasion parameter defines the number of SSBs per RACH occasion for CF-BFR (L1 parameter 'SSB-per-rach-occasion'). If the network receives an RLF report including information that RLF is triggered due to RACH failure, and that this occurred due to BFR and that contention is detected, the network may reconfigure the distribution of SSBs per RACH occasion and/or configure more CBRA resources to avoid the RLFs.

Similar parameters may be tuned for CSI-RS related configurations.

According to certain embodiments, CQD parameters that may be tuned based on assistance information. For example, certain embodiments disclosed herein include the reporting of assistance information by the UE. This assistance information may beforwarded to the DU where the failure has been originated may be used to optimize CQD parameters. These parameters may be one or more of the following in the measurement object:

MeasObjectNR information element

```
    -- ASN1START
    -- TAG-MEAS-OBJECT-NR-START
    MeasObjectNR ::=                        SEQUENCE {
        ssbFrequency                                            ARFCN-ValueNR
OPTIONAL, -- Cond SSBorAssociatedSSB
        ssbSubcarrierSpacing                                    SubcarrierSpacing
OPTIONAL, -- Cond SSBorAssociatedSSB
        smtc1                   SSB-MTC                              OPTIONAL,
-- Cond SSBorAssociatedSSB
        smtc2                   SSB-MTC2                             OPTIONAL,
-- Cond IntraFreqConnected
        refFreqCSI-RS                                           ARFCN-ValueNR
OPTIONAL, -- Cond CSI-RS
        referenceSignalConfig              ,
        absThreshSS-BlocksConsolidation                              ThresholdNR
OPTIONAL, -- Need R
        absThreshCSI-RS-Consolidation                                ThresholdNR
OPTIONAL, -- Need R
        nrofSS-BlocksToAverage                            INTEGER (2..maxNrofSS-
BlocksToAverage)             OPTIONAL, -- Need R
        nrofCSI-RS-ResourcesToAverage                  INTEGER (2..maxNrofCSI-RS-
ResourcesToAverage)          OPTIONAL, -- Need R
        quantityConfigIndex                INTEGER (1..maxNrofQuantityConfig),
        offsetMO                     Q-OffsetRangeList,
        cellsToRemoveList                     PCI-List                 OPTIONAL,
-- Need N
        cellsToAddModList                                          OPTIONAL, -
-- Need N
        blackCellsToRemoveList                             PCI-RangeIndexList
OPTIONAL, -- Need N
        blackCellsToAddModList                     SEQUENCE (SIZE (1..maxNrofPCI-
Ranges)) OF PCI-RangeElement         OPTIONAL, -- Need N
        whiteCellsToRemoveList                             PCI-RangeIndexList
OPTIONAL, -- Need N
        whiteCellsToAddModList                SEQUENCE (SIZE (1..maxNrofPCI-
Ranges)) OF PCI-RangeElement         OPTIONAL, -- Need N
        ...,
        [[
        freqBandIndicatorNR-v1530                          FreqBandIndicatorNR
```

-continued

| MeasObjectNR information element |
| --- |
| OPTIONAL, -- Need R<br>measCycleSCell-v1530 ENUMERATED {sf160, sf256, sf320, sf512, sf640, sf1024, sf1280} OPTIONAL -- Need R<br>]]<br>} |

The absThreshCSI-RS-Consolidation parameter may be the absolute threshold for the consolidation of measurement results per CSI-RS resource(s) from L1 filter(s). The field is used for the derivation of cell measurement results as described in 5.5.3.3 and the reporting of beam measurement information per CSI-RS resource as described in 5.5.5.2.

The absThreshSS-BlocksConsolidation parameter may be an absolute threshold for the consolidation of measurement results per SS/PBCH block(s) from L1 filter(s). The field is used for the derivation of cell measurement results as described in 5.5.3.3 and the reporting of beam measurement information per SS/PBCH block index as described in 5.5.5.2.

The nrofCSInrofCSI-RS-ResourcesToAverage parameter indicates the maximum number of measurement results per beam based on CSI-RS resources to be averaged. The same value applies for each detected cell associated with this MeasObjectNR.

The nroJSS-BlocksToAverage parameter indicates the maximum number of measurement results per beam based on SS/PBCH blocks to be averaged. The same value applies for each detected cell associated with this MeasObject.

These parameters may define per RS how the UE uses beams to compute cell quality. Averaging multiple beams has the potential to reduce handover ping-pong rate but may delay the triggering of measurement reports in case the UE detects multiple beams per cell. Hence, if the network receives an RLF reporting including information that RLF has happened and additional beam measurements (with beams not necessarily used for CQD), network may figure out that RLF has occurred due to too late measurement reports due to CQD based on averages. Hence, receiving these reports may lead the network to disable averaging and/or reduce the number of averaged beams and/or raising the consolidation thresholds so that less beams are used for averaging.

According to certain embodiments, beam reporting parameters may be tuned based on assistance information. RLFs may be happening (e.g., due to too early handovers) because the network hands over the UE to cells with a very good beam (e.g., CQD was very strong) but a very unstable beam, for example in cells with many narrow beams but not very stable. Hence, UE may drop right after performing the handover. That could be avoided by beam reporting for triggered cells. Hence, upon receiving an RLF report containing beam measurements, for example for the serving cell, the network may activate beam reporting, or possibly increase number of beams to be reported or lower consolidation thresholds so more beam measurements are included in measurement reports. These parameters are included in the reportConfig, as shown below:

ReportConfigNR information element

```
-- ASN1START
-- TAG-REPORT-CONFIG-START
ReportConfigNR ::=                    SEQUENCE {
    reportType                        CHOICE {
        periodical                        PeriodicalReportConfig,
        eventTriggered                        EventTriggerConfig,
        ...,
        reportCGI
    }
}
ReportCGI ::=                         SEQUENCE {
    cellForWhichToReportCGI               PhysCellId,
        ...
}
EventTriggerConfig::=                 SEQUENCE {
    eventId                           CHOICE {
        eventA1                           SEQUENCE {
            a1-Threshold                          MeasTriggerQuantity,
            reportOnLeave                          BOOLEAN,
            hysteresis                         ,
            timeToTrigger
        },
        eventA2                           SEQUENCE {
            a2-Threshold                          MeasTriggerQuantity,
            reportOnLeave                          BOOLEAN,
            hysteresis                         ,
            timeToTrigger
        },
        eventA3                           SEQUENCE {
            a3-Offset                         MeasTriggerQuantityOffset,
            reportOnLeave                          BOOLEAN,
            hysteresis                         ,
            timeToTrigger                       ,
            useWhiteCellList                       BOOLEAN
        },
```

-continued

```
                    ReportConfigNR information element

        eventA4                             SEQUENCE {
            a4-Threshold                        MeasTriggerQuantity,
            reportOnLeave                       BOOLEAN,
            hysteresis                          ,
            timeToTrigger                       ,
            useWhiteCellList                    BOOLEAN
        },
        eventA5                             SEQUENCE {
            a5-Threshold1                       MeasTriggerQuantity,
            a5-Threshold2                       MeasTriggerQuantity,
            reportOnLeave                       BOOLEAN,
            hysteresis                          ,
            timeToTrigger                       ,
            useWhiteCellList                    BOOLEAN
        },
        eventA6                             SEQUENCE {
            a6-Offset                           MeasTriggerQuantityOffset,
            reportOnLeave                       BOOLEAN,
            hysteresis                          ,
            timeToTrigger                       ,
            useWhiteCellList                    BOOLEAN
        },
        ...,
    },
    rsType                              NR-RS-Type,
    reportInterval                      ,
    reportAmount                            ENUMERATED {r1, r2, r4, r8, r16, r32,
r64, infinity},
    reportQuantityCell                      MeasReportQuantity,
    maxReportCells                          INTEGER (1..maxCellReport),
    reportQuantityRS-Indexes                        MeasReportQuantity
OPTIONAL, -- Need R
    maxNrofRS-IndexesToReport                           INTEGER
(1..maxNrofIndexesToReport)                     OPTIONAL, -- Need R
    includeBeamMeasurements                     BOOLEAN,
    reportAddNeighMeas                              ENUMERATED {setup}
OPTIONAL, -- Need R
    ...
}
PeriodicalReportConfig ::=                  SEQUENCE {
    rsType                              NR-RS-Type,
    reportInterval                      ,
    reportAmount                                ENUMERATED {r1, r2, r4, r8, r16, r32,
r64, infinity},
    reportQuantityCell                          MeasReportQuantity,
    maxReportCells                              INTEGER (1..maxCellReport),
    reportQuantityRS-Indexes                            MeasReportQuantity
OPTIONAL, -- Need R
    maxNrofRS-IndexesToReport                               INTEGER
(1..maxNrofIndexesToReport)                     OPTIONAL, -- Need R
    includeBeamMeasurements                         BOOLEAN,
    useWhiteCellList                            BOOLEAN,
    ...
}
NR-RS-Type                              ENUMERATED {ssb, csi-rs}
MeasTriggerQuantity ::=                     CHOICE {
    rsrp                            RSRP-Range,
    rsrq                            RSRQ-Range,
    sinr                            SINR-Range
}
MeasTriggerQuantityOffset ::=                   CHOICE {
    rsrp                            INTEGER (-30..30),
    rsrq                            INTEGER (-30..30),
    sinr                            INTEGER (-30..30)
}
MeasReportQuantity ::=                      SEQUENCE {
    rsrp                            BOOLEAN,
    rsrq                            BOOLEAN,
    sinr                            BOOLEAN
}
-- TAG-REPORT-CONFIG-STOP
-- ASN1STOP
```

The maxNrofRS-IndexesToReport parameter indicates to the UE the maximum number of RS indexes to include in the measurement report for A1-A6 events. This value may be increased in case RLFs are being triggered due to the network deciding to perform handovers to cells with too few good beams (i.e., providing good cell coverage due to best beam, but not so stable).

Figure 10:
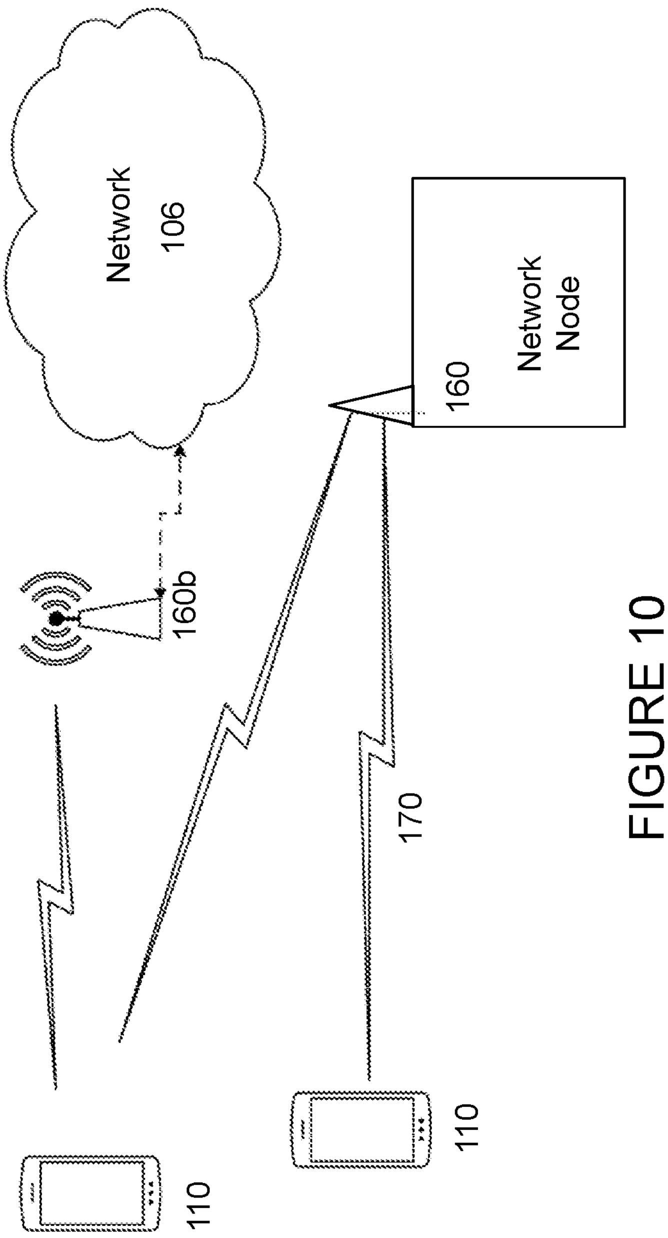
FIG. 10 illustrates an example wireless network, according to certain embodiments.

FIG. 10 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 106, network nodes 160 and 160*b*, and wireless devices 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 11:
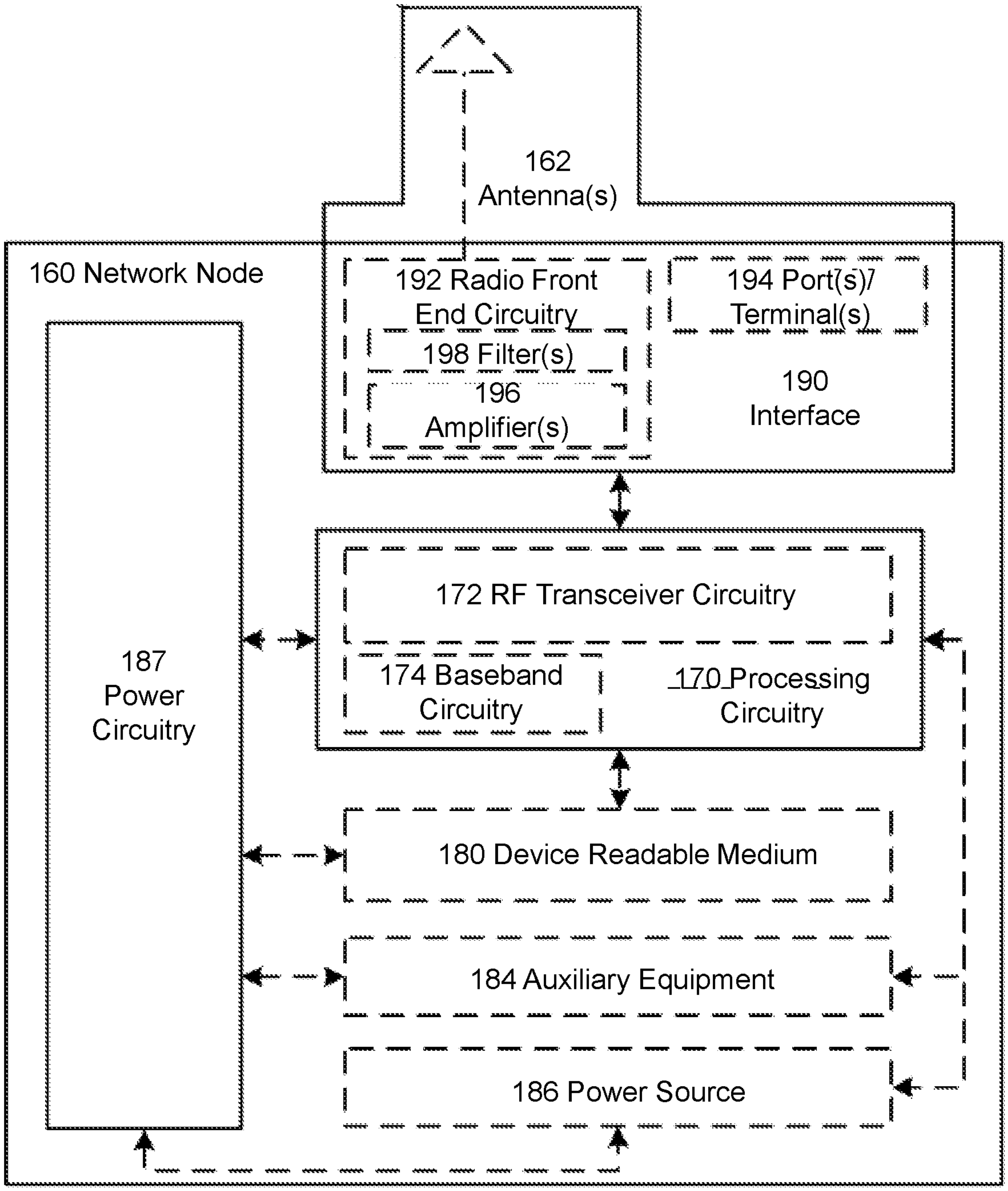
FIG. 11 illustrates an example network node according to certain embodiments.

FIG. 11 illustrates an example network node, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 160 includes processing circuitry 170, device readable medium 180, interface 190, auxiliary equipment 184, power source 186, power circuitry 187, and antenna 162. Although network node 160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 11 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 12:
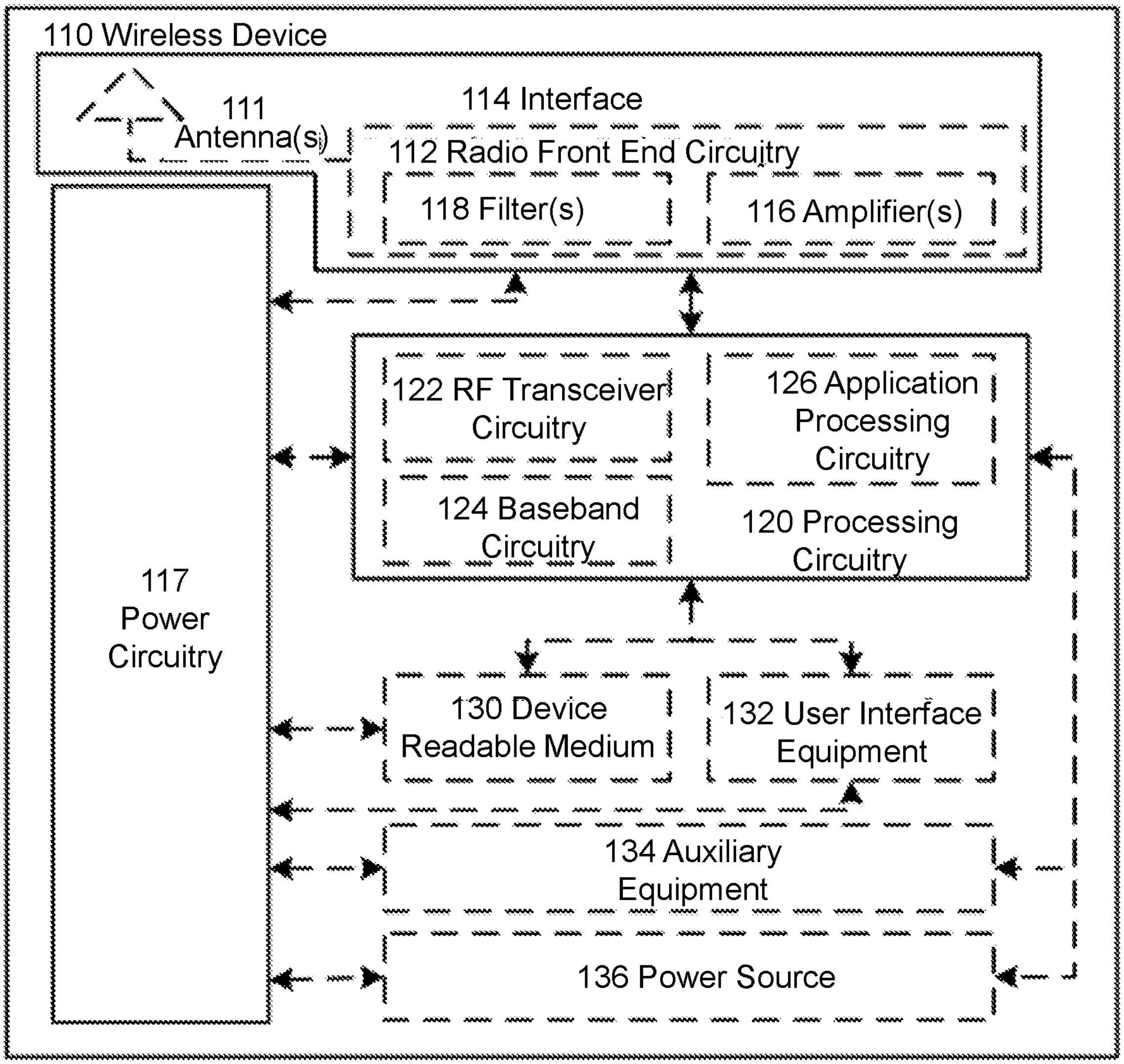
FIG. 12 illustrates an example wireless device, according to certain embodiments.

FIG. 12 illustrates an example wireless device, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 13:
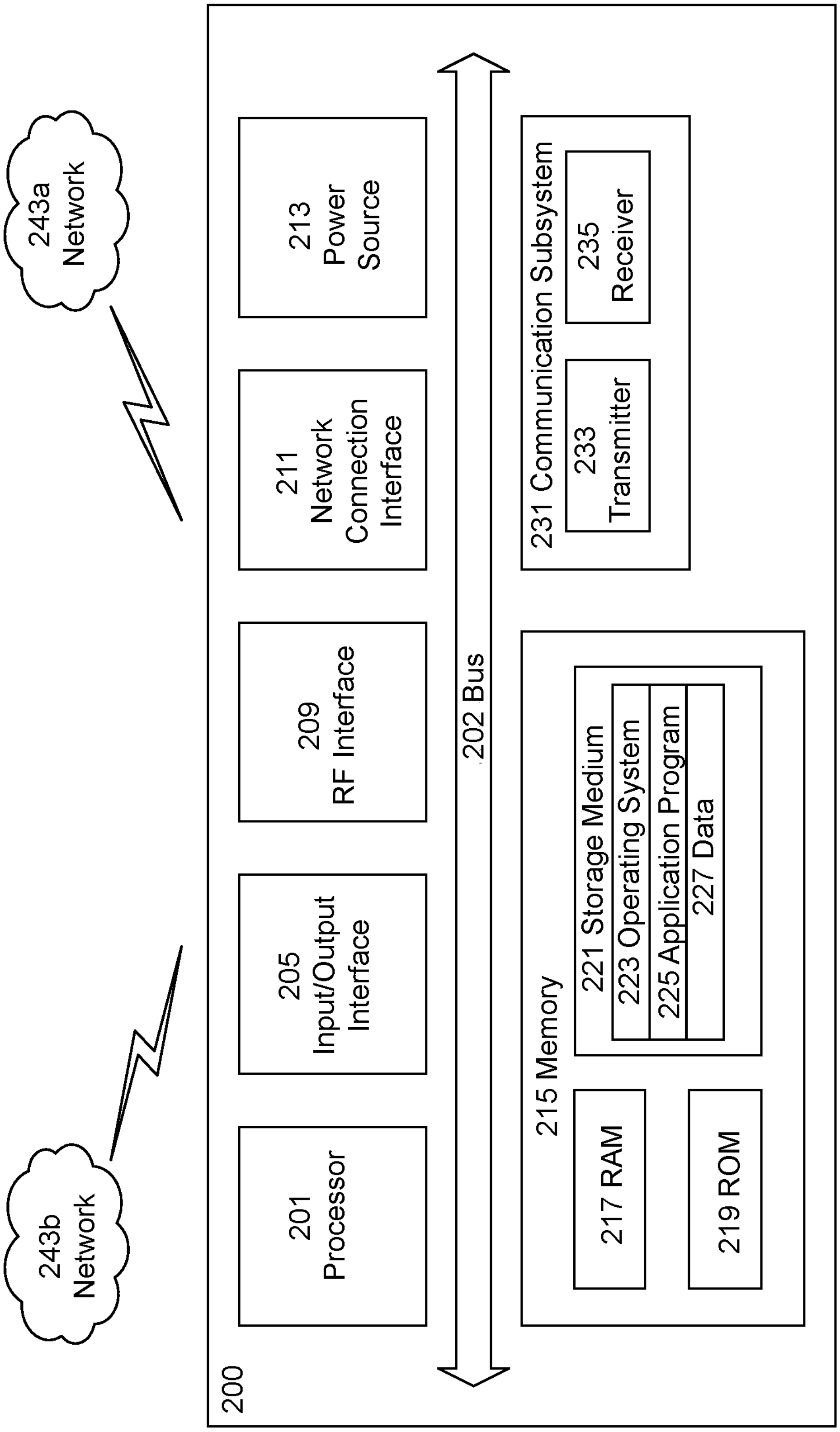
FIG. 13 illustrate an example user equipment, according to certain embodiments.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 13, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 13 is a UE, the components discussed herein are equally applicable to a wireless device, and vice-versa.

In FIG. 13, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 209 may be configured to provide a communication interface to RF components such as a transmitter, a receiver, and an antenna. Network connection interface 211 may be configured to provide a communication interface to network **243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211** may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 13, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 14:
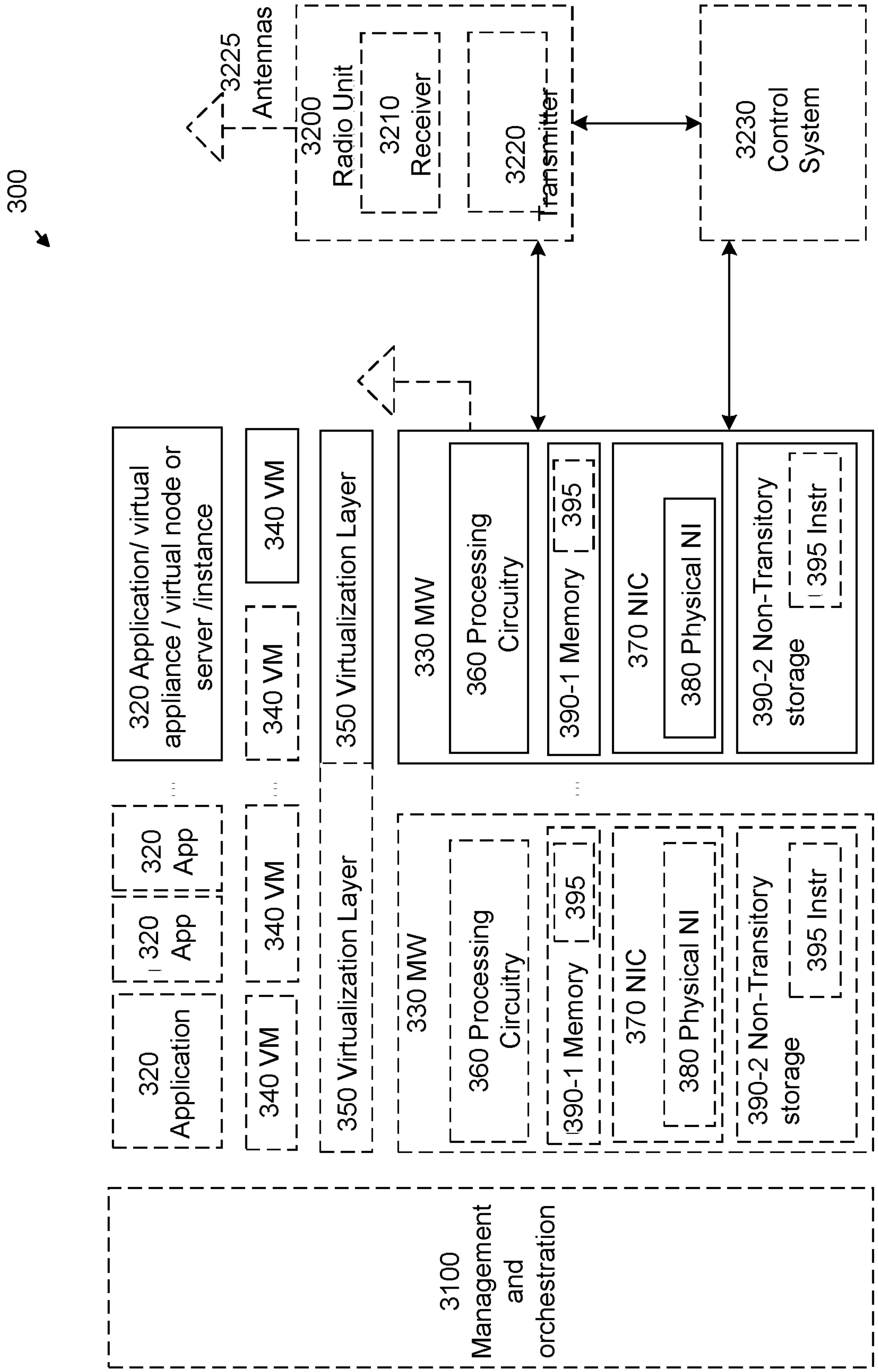
FIG. 14 illustrates a virtualization environment in which functions implemented by some embodiments may be virtualized, according to certain embodiments.

FIG. 14 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 14, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 14.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 15:
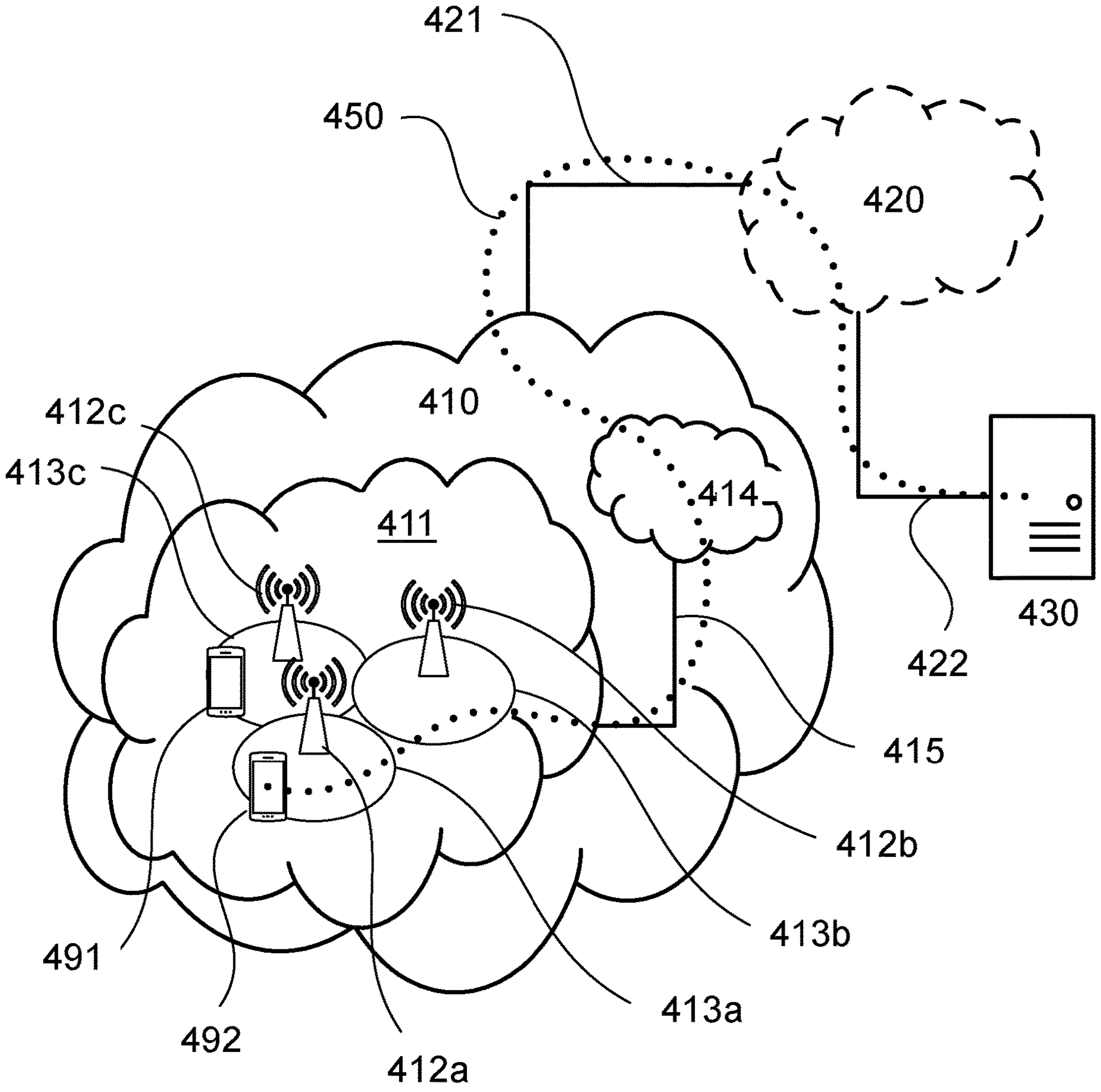
FIG. 15 illustrates a telecommunication network connected via an intermediate network to a host computer, according to certain embodiments.

FIG. 15 illustrates a telecommunication network connected via an intermediate network to a host computer in accordance with some embodiments. With reference to FIG. 15, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 15 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 16:
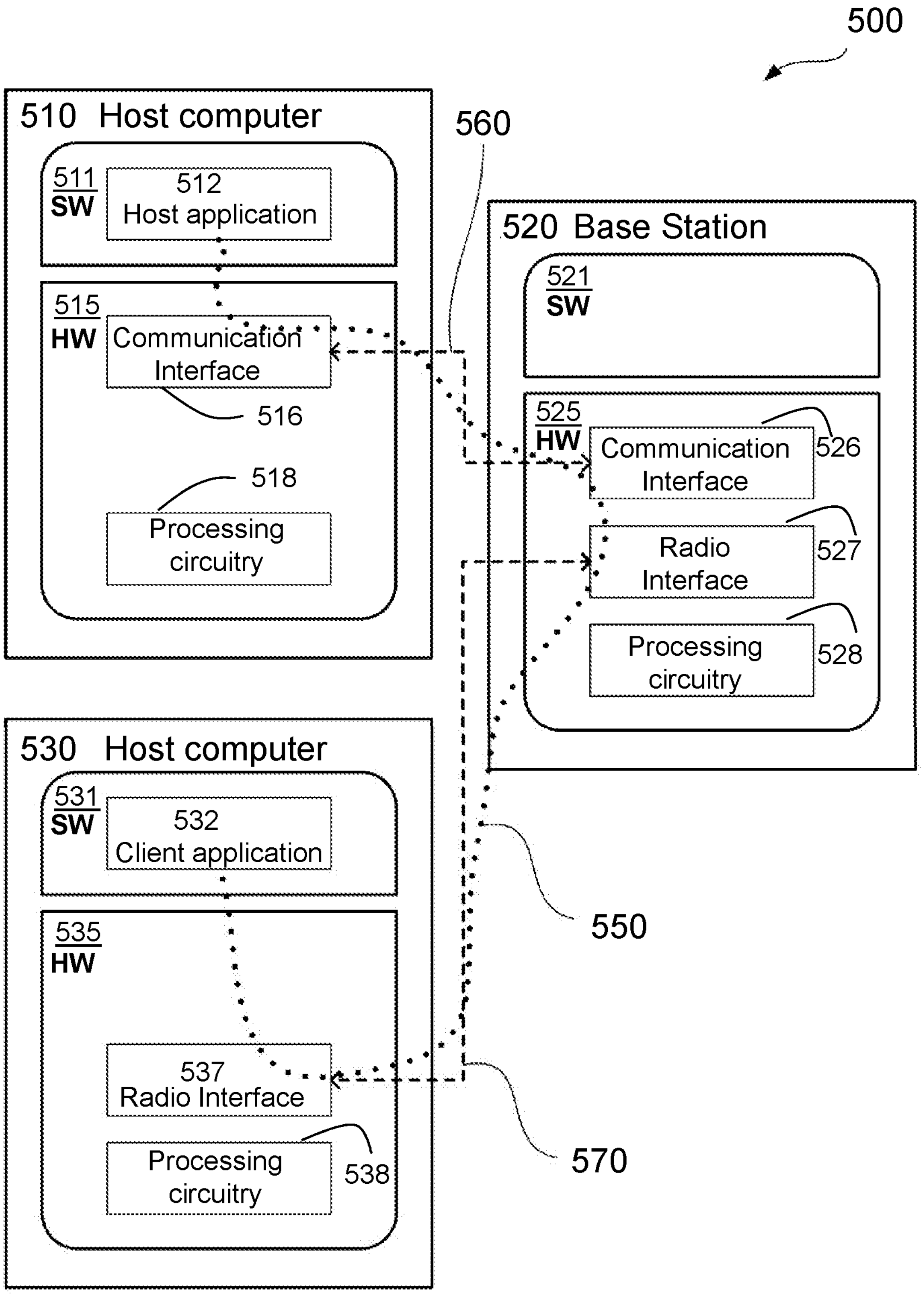
FIG. 16 illustrates a generalized block diagram of a host computer communicating via a base station with a user equipment over a partially wireless connection, according to certain embodiments.

FIG. 16 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 16. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 16) served by base station 520. Communication interface 526 may be configured to facilitate connection 560 to host computer 510. Connection 560 may be direct or it may pass through a core network (not shown in FIG. 16) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 16 may be similar or identical to host computer 430, one of base stations 412*a*, 412*b*, 412*c* and one of UEs 491, 492 of FIG. 15, respectively. This is to say, the inner workings of these entities may be as shown in FIG. 16 and independently, the surrounding network topology may be that of FIG. 15.

In FIG. 16, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 17:
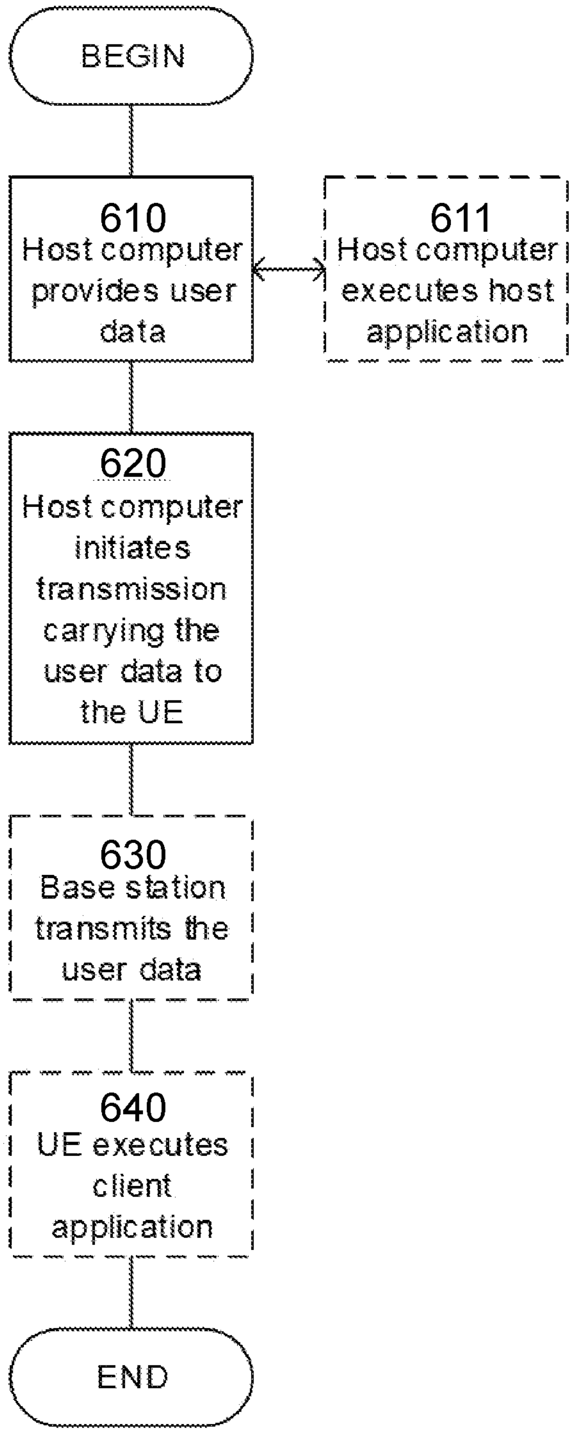
FIG. 17 illustrates a method implemented in a communication system, according to one embodiment.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 18:
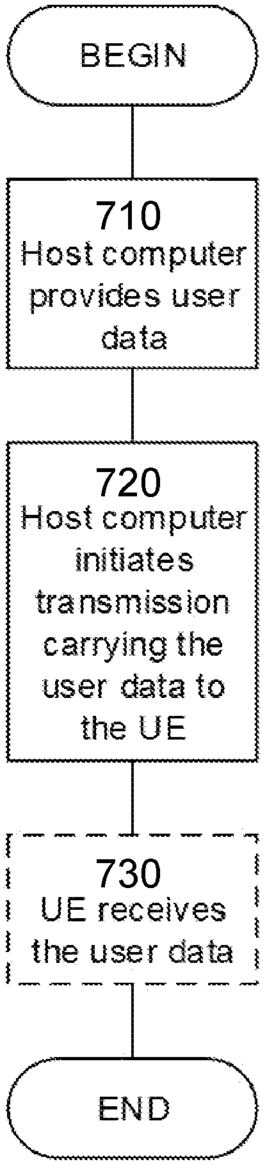
FIG. 18 illustrates another method implemented in a communication system, according to one embodiment.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 19:
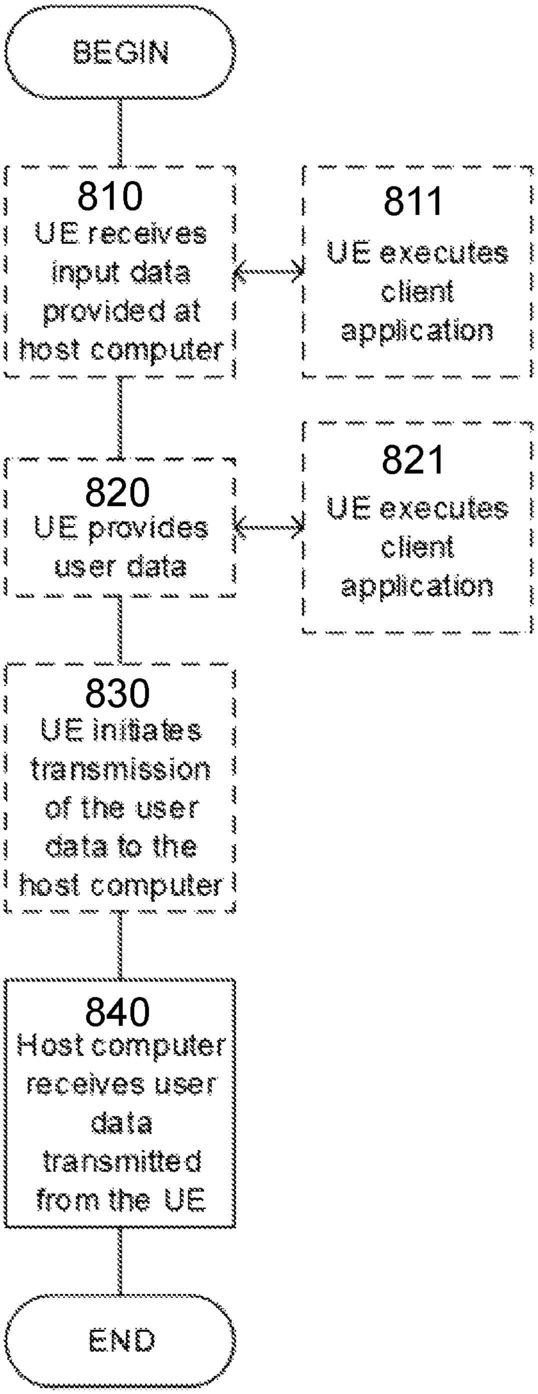
FIG. 19 illustrates another method implemented in a communication system, according to one embodiment.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 20:
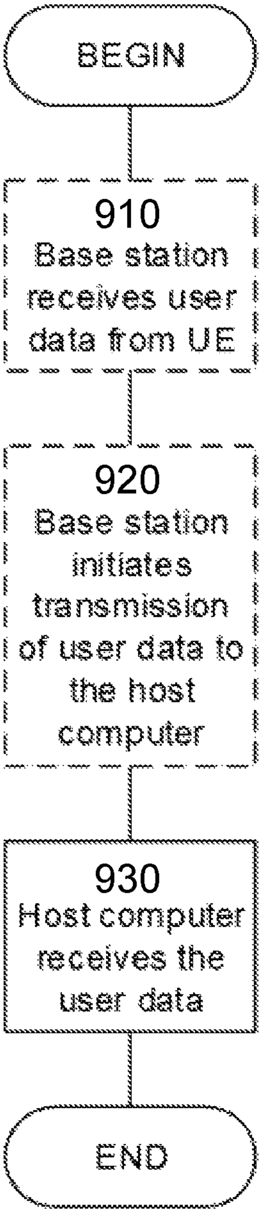
FIG. 20 illustrates another method implemented in a communication system, according to one embodiment.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 21:
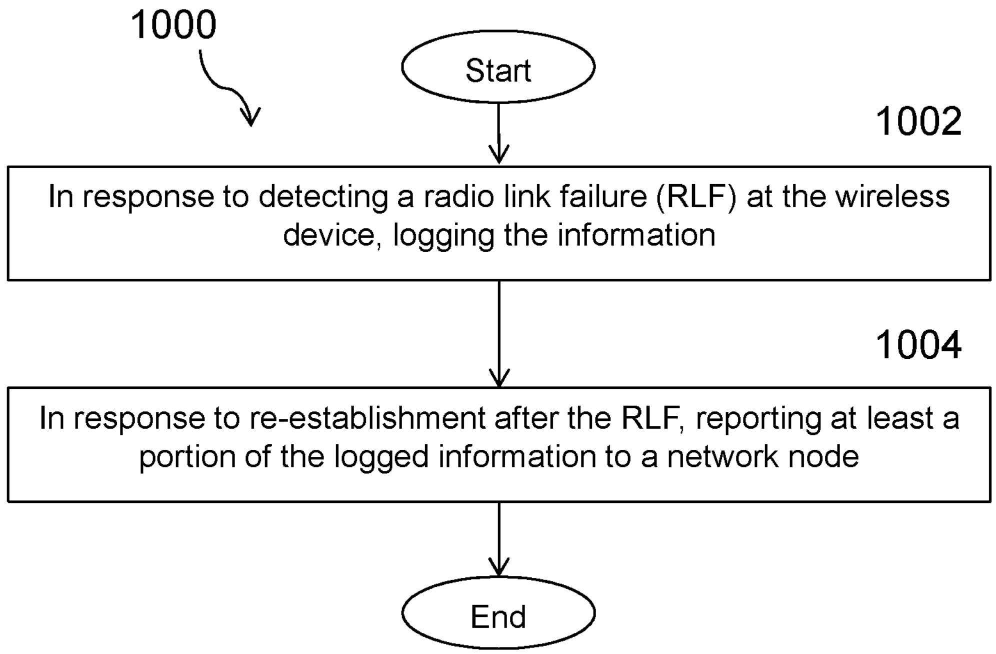
FIG. 21 illustrates an example method by a wireless device, according to certain embodiments.

FIG. 21 is a flow chart of a method in a wireless device, in accordance with particular embodiments. More particularly, FIG. 21 illustrates an example of a method performed by a wireless device (e.g., a UE) for reporting channel quality. The method begins at step 1002, where the wireless device, in response to detecting a RLF at the wireless device, logs information.

In certain embodiments, the method may further comprise detecting the RLF due to the expiry of timer 310. In certain embodiments, the method may further comprise detecting a beam failure. In certain embodiments, the logged information may comprise an indication for the detection of the beam failure. In certain embodiments, the logged information may further comprise state information when the beam failure detection occurred, the state information may comprise one or more of: beam measurement information on resources that were being monitored when the beam failure was detected; and beam measurement information on other resources. In certain embodiments, the logged information may comprise beam measurement information of one or more serving cells on reference signals the wireless device is monitoring for radio link monitoring or beam failure detection. In certain embodiments, the logged information may comprise beam measurement information of one or more neighboring cells on reference signals the wireless device is monitoring for radio link monitoring or beam failure detection. In certain embodiments, the logged information may comprise beam measurement information of one or more serving cells on reference signals the wireless device is monitoring for radio resource management. In certain embodiments, the logged information may comprise beam measurement information of one or more neighbor cells on reference signals the UE is monitoring for radio resource management.

In certain embodiments, the method may comprise detecting the RLF due to an indication from medium access control of a random access channel failure. In certain embodiments, the random access channel failure may be due to the wireless device reaching the maximum number of random access channel attempts. In certain embodiments, the method may further comprise detecting a beam failure. In certain embodiments, the logged information may comprise an indication for the detection of the beam failure. In certain embodiments, the logged information may further comprise state information when the beam failure detection occurred, the state information may comprise one or more of: beam measurement information on resources that were being monitored when the beam failure was detected; and beam measurement information on other resources.

In certain embodiments, the method may further comprise determining that beam failure recovery has been triggered. In certain embodiments, the logged information may comprise an indication that beam failure recovery has been triggered. In certain embodiments, the logged information may further comprise state information when the beam failure recovery occurred, the state information may comprise one or more of: for each random access channel attempt, beam measurement information on resources and/or beams that were selected when the beam failure recovery was triggered; and beam measurement information on other resources. In certain embodiments, the logged information may comprise beam measurement information of one or more serving cells on reference signals the wireless device is monitoring for radio link monitoring or beam failure detection. In certain embodiments, the logged information may comprise beam measurement information of one or more neighboring cells on reference signals the wireless device is monitoring for radio link monitoring or beam failure detection. In certain embodiments, the logged information may comprise beam measurement information of one or more serving cells on reference signals the wireless device is monitoring for radio resource management. In certain embodiments, the logged information may comprise beam measurement information of one or more neighbor cells on reference signals the UE is monitoring for radio resource management.

In certain embodiments, the logged information may comprise beam information for different preamble retransmissions. In certain embodiments, the beam information for different preamble transmissions may comprise one or more of: beam measurement information on each attempt; an occurrence of beam selection in each attempt; an occurrence of power ramping on a same beam; and a detection of contention for a given selected beam.

At step 1004, in response to re-establishment after the RLF, the wireless device reports at least a portion of the logged information to a network node.

In certain embodiments, the method may further comprise sending, to the network node, an indication that the wireless device has logged information available. In certain embodiments, the method may further comprise receiving, from the network node in response to the indication that the wireless device has logged information available, a request to report the logged information. In certain embodiments, the method may further comprise reporting the at least a portion of the logged information to the network node in response to the received request.

In certain embodiments, the method may further comprise providing user data and forwarding the user data to a host computer via the transmission to the network node.

Figure 22:
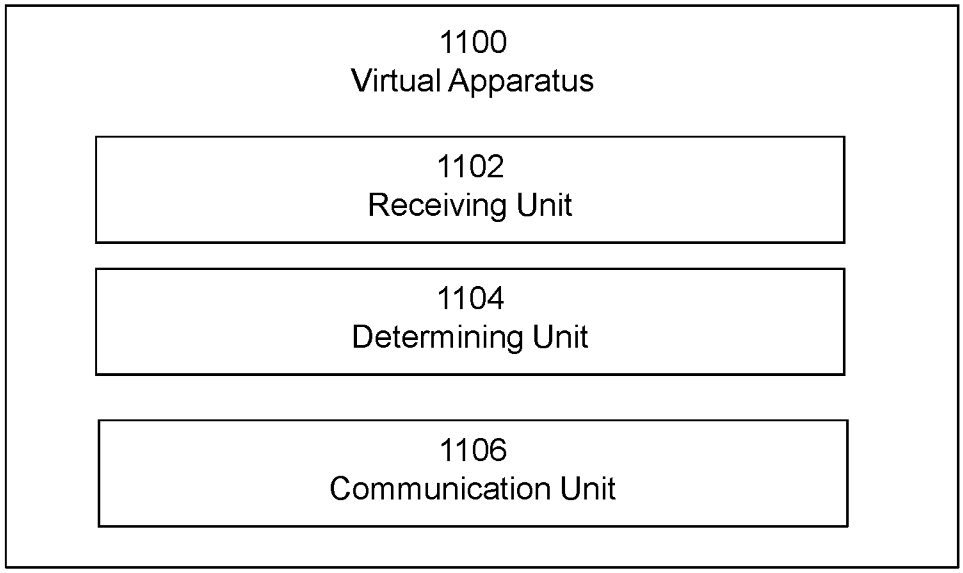
FIG. 22 illustrates an exemplary virtual computing device, according to certain embodiments.

FIG. 22 illustrates a schematic block diagram of an apparatus 1100 in a wireless network (for example, the wireless network shown in FIG. 10). The apparatus may be implemented in a wireless device (e.g., wireless device 110 shown in FIG. 10). Apparatus 1100 is operable to carry out the example method described with reference to FIG. 21 and possibly any other processes or methods disclosed herein. It is also to be understood that the method of FIG. 21 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1102, determining unit 1104, communication unit 1106, and any other suitable units of apparatus 1100 to perform corresponding functions according one or more embodiments of the present disclosure.

In certain embodiments, apparatus 1100 may be a UE. As illustrated in FIG. 22, apparatus 1100 includes receiving unit 1102, determining unit 1104, and communication unit 1106. Receiving unit 1102 may be configured to perform the receiving functions of apparatus 1100. For example, receiving unit 1102 may be configured to receive, from the network node in response to the indication that the wireless device has logged information available, a request to report the logged information.

Receiving unit 1102 may receive any suitable information (e.g., from a wireless device or another network node). Receiving unit 1102 may include a receiver and/or a transceiver, such as RF transceiver circuitry 122 described above in relation to FIG. 12. Receiving unit 1102 may include circuitry configured to receive messages and/or signals (wireless or wired). In particular embodiments, receiving unit 1102 may communicate received messages and/or signals to determining unit 1104 and/or any other suitable unit of apparatus 1100. The functions of receiving unit 1102 may, in certain embodiments, be performed in one or more distinct units.

Determining unit 1104 may perform the processing functions of apparatus 1100. For example, determining unit 1104 may be configured to, in response to detecting a radio link failure (RLF) at the wireless device, log information. As another example, determining unit 1104 may be configured to, in response to re-establishment after the RLF, report at least a portion of the logged information to a network node. As still another example, determining unit 1104 may be configured to detect the RLF due to the expiry of timer 310. As yet another example, determining unit 1104 may be configured to detect a beam failure. As another example, determining unit 1104 may be configured to detect the RLF due to an indication from medium access control of a random access channel failure. As another example, determining unit 1104 may be configured to determine that beam failure recovery has been triggered. As another example, determining unit 1104 may be configured to provide user data.

Determining unit 1104 may include or be included in one or more processors, such as processing circuitry 120 described above in relation to FIG. 12. Determining unit 1104 may include analog and/or digital circuitry configured to perform any of the functions of determining unit 1104 and/or processing circuitry 120 described above. The functions of determining unit 1104 may, in certain embodiments, be performed in one or more distinct units.

Communication unit 1106 may be configured to perform the transmission functions of apparatus 1100. For example, communication unit 1106 may be configured to send the report comprising at least a portion of the logged information to a network node. As another example, communication unit 1106 may be configured to send, to the network node, an indication that the wireless device has logged information available. As still another example, communication unit 1106 may be configured to report the at least a portion of the logged information to the network node in response to the received request. As yet another example, communication unit 1106 may be configured to forward the user data to a host computer via a transmission to the network node.

Communication unit 1106 may transmit messages (e.g., to a wireless device and/or another network node). Communication unit 1106 may include a transmitter and/or a transceiver, such as RF transceiver circuitry 122 described above in relation to FIG. 12. Communication unit 1106 may include circuitry configured to transmit messages and/or signals (e.g., through wireless or wired means). In particular embodiments, communication unit 1106 may receive messages and/or signals for transmission from determining unit 1104 or any other unit of apparatus 1100. The functions of communication unit 1104 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 23:
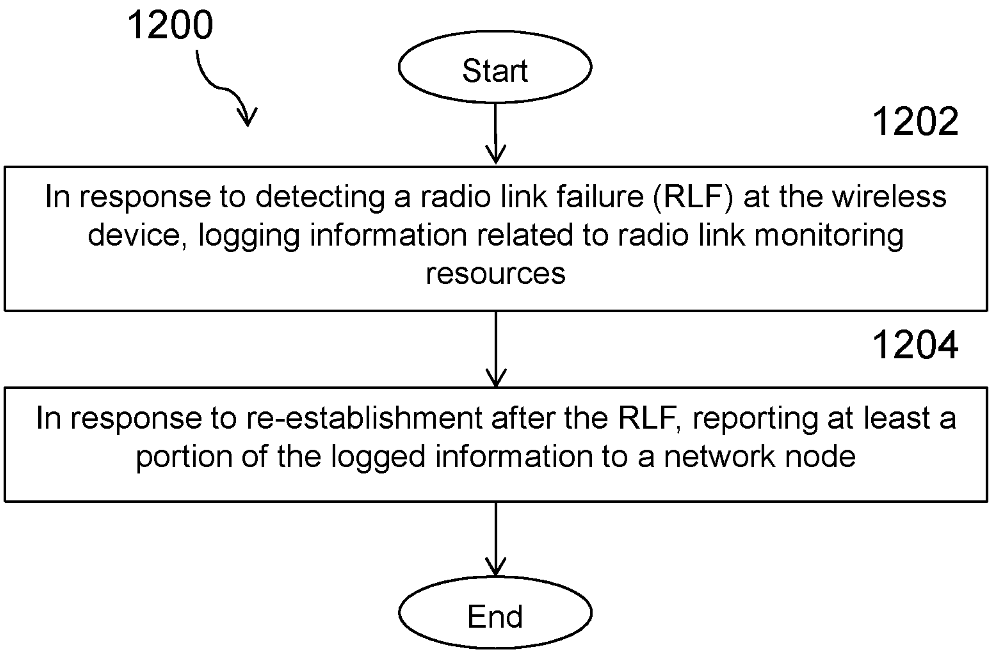
FIG. 23 illustrates another example method by a wireless device, according to certain embodiments.

FIG. 23 illustrates a method performed by a wireless device 110, in accordance with particular embodiments. The method begins at step 1202, when in response to detecting a RLF at the wireless device, wireless device 110 logs information related to radio link monitoring resources. In response to re-establishment after the RLF, wireless device 110 reports at least a portion of the logged information to a network node, at step 1204.

In a particular embodiment, wireless device 110 detects the RLF due to the expiry of timer 310.

In a particular embodiment, when detecting the RLF, wireless device 110 detects a BFR failure or beam failure recovery failure, and the logged information includes an indication for the detection of the beam failure. If the wireless device 110 fails by reaching the maximum number of RACH attempts, it is an indication of failure due to beam failure recovery failure.

In a particular embodiment, the logged information includes state information when the detection of RLF occurred, and the state information includes one or more of: beam measurement information on resources that were being monitored when the RLF was detected; and beam measurement information on other resources.

In a particular embodiment, the logged information includes beam measurement information of one or more serving cells on reference signals the wireless device is monitoring.

In a particular embodiment, the wireless device 110 detects the RLF due to an indication from medium access control of a RACH failure.

In a particular embodiment, the logged information includes beam measurement information of one or more neighboring cells on reference signals the wireless device is monitoring.

In a particular embodiment, the logged information includes beam measurement information of one or more serving cells on reference signals the wireless device is monitoring for radio resource management.

In a particular embodiment, the logged information includes beam information associated with different preamble retransmissions.

In a particular embodiment, the beam information associated with different preamble transmissions comprises one or more of: beam measurement information on each attempt; an occurrence of power ramping on a same beam; and a detection of contention for a given selected beam.

In a particular embodiment, wireless device 110 sends, to the network node, an indication that the wireless device has logged information available.

In a particular embodiment, wireless device 110 receives, from the network node in response to the indication that the wireless device has logged information available, a request to report the logged information and reports the at least a portion of the logged information to the network node in response to the received request.

Figure 24:
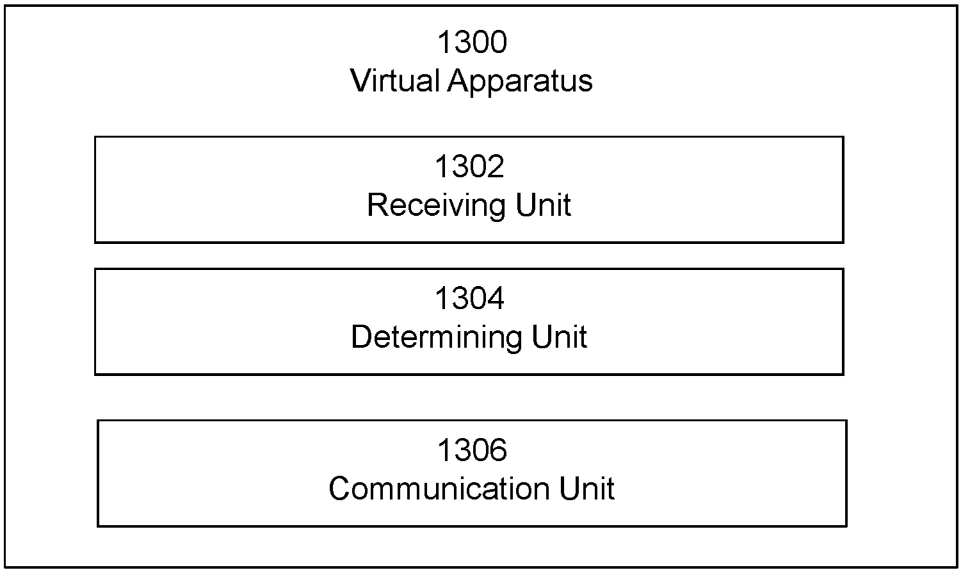
FIG. 24 illustrates an exemplary virtual computing device, according to certain embodiments.

FIG. 24 illustrates a schematic block diagram of an apparatus 1300 in a wireless network (for example, the wireless network shown in FIG. 10). The apparatus may be implemented in a wireless device (e.g., wireless device 110 shown in FIG. 10). Apparatus 1100 is operable to carry out the example method described with reference to FIG. 23 and possibly any other processes or methods disclosed herein. It is also to be understood that the method of FIG. 23 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1302, determining unit 1304, communication unit 1306, and any other suitable units of apparatus 1300 to perform corresponding functions according one or more embodiments of the present disclosure.

In certain embodiments, apparatus 1300 may be a UE. As illustrated in FIG. 24, apparatus 1300 includes receiving unit 1302, determining unit 1304, and communication unit 1306. Receiving unit 1302 may be configured to perform the receiving functions of apparatus 1300. For example, receiving unit 1302 may be configured to receive, from the network node in response to the indication that the wireless device has logged information available, a request to report the logged information.

Receiving unit 1302 may receive any suitable information (e.g., from a wireless device or another network node). Receiving unit 1302 may include a receiver and/or a transceiver, such as RF transceiver circuitry 122 described above in relation to FIG. 12. Receiving unit 1302 may include circuitry configured to receive messages and/or signals (wireless or wired). In particular embodiments, receiving unit 1302 may communicate received messages and/or signals to determining unit 1304 and/or any other suitable unit of apparatus 1300. The functions of receiving unit 1302 may, in certain embodiments, be performed in one or more distinct units.

Determining unit 1304 may perform the processing functions of apparatus 1300. For example, determining unit 1304 may be configured to, in response to detecting a RLF at the wireless device, log information related to radio link monitoring resources. As another example, determining unit 1304 may be configured to, in response to re-establishment after the RLF, report at least a portion of the logged information to a network node. As still another example, determining unit 1304 may be configured to detect the RLF due to the expiry of timer 310. As yet another example, determining unit 1304 may be configured to detect a beam failure. As another example, determining unit 1304 may be configured to detect the RLF due to an indication from medium access control of a random access channel failure. As another example, determining unit 1304 may be configured to determine that beam failure recovery has been triggered. As another example, determining unit 1304 may be configured to provide user data.

Determining unit 1304 may include or be included in one or more processors, such as processing circuitry 120 described above in relation to FIG. 12. Determining unit 1304 may include analog and/or digital circuitry configured to perform any of the functions of determining unit 1304 and/or processing circuitry 120 described above. The functions of determining unit 1304 may, in certain embodiments, be performed in one or more distinct units.

Communication unit 1306 may be configured to perform the transmission functions of apparatus 1300. For example, in response to re-establishment after the RLF, communication unit 1306 may be configured to send the report comprising at least a portion of the logged information to a network node. As another example, communication unit 1306 may be configured to send, to the network node, an indication that the wireless device has logged information available. As still another example, communication unit 1306 may be configured to report the at least a portion of the logged information to the network node in response to the received request. As yet another example, communication unit 1306 may be configured to forward the user data to a host computer via a transmission to the network node.

Communication unit 1306 may transmit messages (e.g., to a wireless device and/or another network node). Communication unit 1306 may include a transmitter and/or a transceiver, such as RF transceiver circuitry 122 described above in relation to FIG. 10. Communication unit 1306 may include circuitry configured to transmit messages and/or signals (e.g., through wireless or wired means). In particular embodiments, communication unit 1306 may receive messages and/or signals for transmission from determining unit 1304 or any other unit of apparatus 1300. The functions of communication unit 1304 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 25:
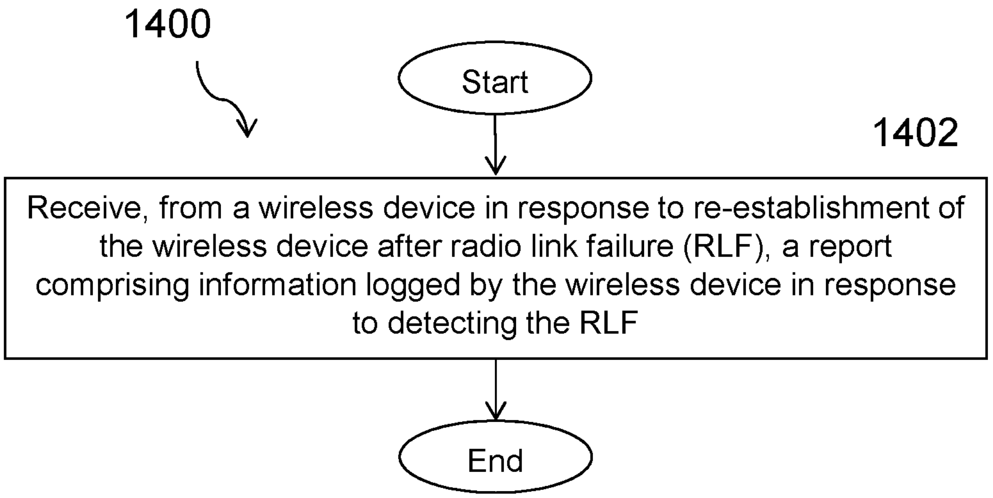
FIG. 25 illustrates an example method by a network node, according to certain embodiments.

FIG. 25 is a flow chart of a method 1400 in a network node, in accordance with particular embodiments. More particularly, FIG. 25 illustrates an example of a method performed by a network node (e.g., eNB) for triggering channel quality reporting. The method begins at step 1402, where the network node receives, from a wireless device in response to re-establishment of the wireless device after RLF, a report comprising information logged by the wireless device in response to detecting the radio link failure.

In certain embodiments, the method may comprise receiving, from the wireless device, an indication that the wireless device has logged information available. In certain embodiments, the method may further comprise sending, to the wireless device in response to the received indication that the wireless device has logged information available, a request to report the logged information. In certain embodiments, the method may further comprise receiving the report comprising information logged by the wireless device in response to the request.

In certain embodiments, the RLF may be due to the expiry of timer 310. In certain embodiments, the logged information may comprise an indication that the wireless device detected a beam failure. In certain embodiments, the logged information may further comprise state information when the detection of the RLF occurred, the state information may comprise one or more of: beam measurement information on resources that were being monitored by the wireless device when the RLF was detected; and beam measurement information on other resources. In certain embodiments, the logged information may comprise beam measurement information of one or more serving cells on reference signals the wireless device was monitoring. In certain embodiments, the logged information may comprise beam measurement information of one or more neighboring cells on reference signals the wireless device was monitoring. In certain embodiments, the logged information may comprise beam measurement information of one or more serving cells on reference signals the wireless device was monitoring for radio resource management. In certain embodiments, the logged information may comprise beam measurement information of one or more neighbor cells on reference signals the UE was monitoring for radio resource management.

In certain embodiments, the RLF may be due to an indication from medium access control of a random access channel failure. In certain embodiments, the random access channel failure may be due to the wireless device reaching the maximum number of random access channel attempts. In certain embodiments, the logged information may comprise an indication that the wireless device detected a beam failure. In certain embodiments, the logged information may further comprise state information when the beam failure detection occurred, the state information may comprise one or more of: beam measurement information on resources that were being monitored when the beam failure was detected; and beam measurement information on other resources. In certain embodiments, the logged information may comprise an indication that the wireless device detected that beam failure recovery was triggered. In certain embodiments, the logged information may further comprise state information when the beam failure recovery occurred, the state information may comprise one or more of: for each random access channel attempt, beam measurement information on resources and/or beams that were selected when the beam failure recovery was triggered; and beam measurement information on other resources. In certain embodiments, the logged information may comprise beam measurement information of one or more serving cells on reference signals the wireless device was monitoring for radio link monitoring or beam failure detection. In certain embodiments, the logged information may comprise beam measurement information of one or more neighboring cells on reference signals the wireless device was monitoring for radio link monitoring or beam failure detection. In certain embodiments, the logged information may comprise beam measurement information of one or more serving cells on reference signals the wireless device was monitoring for radio resource management. In certain embodiments, the logged information may comprise beam measurement information of one or more neighbor cells on reference signals the UE was monitoring for radio resource management. In certain embodiments, the logged information may comprise beam information associated with different preamble retransmissions. In certain embodiments, the beam information associated with different preamble transmissions may comprise one or more of: beam measurement information on each attempt; an occurrence of beam selection in each attempt; an occurrence of power ramping on a same beam; and a detection of contention for a given selected beam.

In certain embodiments, the method may further comprise obtaining user data and forwarding the user data to a host computer or a wireless device.

Figure 26:
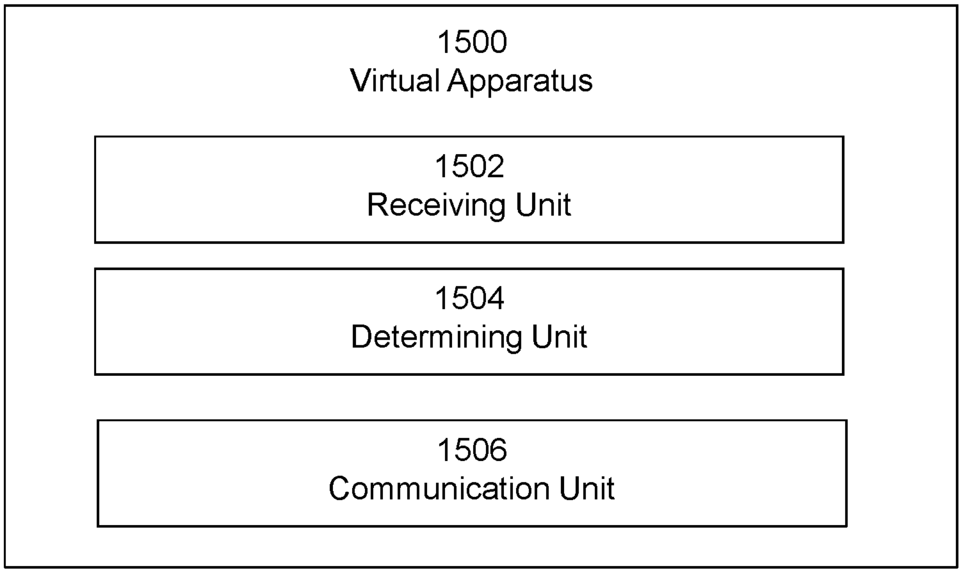
FIG. 26 illustrates another exemplary virtual computing device, according to certain embodiments.

FIG. 26 illustrates a schematic block diagram of an apparatus 1500 in a wireless network (for example, the wireless network shown in FIG. 10). The apparatus may be implemented in a network node (e.g., network node 160 shown in FIG. 10). Apparatus 1500 is operable to carry out the example method described with reference to FIG. 25 and possibly any other processes or methods disclosed herein. It is also to be understood that the method of FIG. 25 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1502, determining unit 1504, communication unit 1506, and any other suitable units of apparatus 1500 to perform corresponding functions according one or more embodiments of the present disclosure.

In certain embodiments, apparatus 1506 may be a gNB-CU or a gNB-DU. As illustrated in FIG. 26, apparatus 1500 includes receiving unit 1502, determining unit 1504, and communication unit 1506. Receiving unit 1502 may be configured to perform the receiving functions of apparatus 1500. For example, receiving unit 1502 may be configured to receive, from a wireless device in response to re-establishment of the wireless device after RLF, a report comprising information logged by the wireless device in response to detecting the radio link failure. As another example, receiving unit 1502 may be configured to receive, from the wireless device, an indication that the wireless device has logged information available. As still another example, receiving unit 1502 may be configured to receive the report comprising information logged by the wireless device in response to a request. As yet another example, receiving unit 1502 may be configured to obtain user data.

Receiving unit 1502 may receive any suitable information (e.g., from a wireless device or another network node). Receiving unit 1502 may include a receiver and/or a transceiver, such as RF transceiver circuitry 172 described above in relation to FIG. 11. Receiving unit 1502 may include circuitry configured to receive messages and/or signals (wireless or wired). In particular embodiments, receiving unit 1502 may communicate received messages and/or signals to determining unit 1504 and/or any other suitable unit of apparatus 1500. The functions of receiving unit 1502 may, in certain embodiments, be performed in one or more distinct units.

Determining unit 1504 may perform the processing functions of apparatus 1500. For example, determining unit 1504 may be configured to obtain user data.

Determining unit 1504 may include or be included in one or more processors, such as processing circuitry 170 described above in relation to FIG. 11. Determining unit 1504 may include analog and/or digital circuitry configured to perform any of the functions of determining unit 1504 and/or processing circuitry 170 described above. The functions of determining unit 1504 may, in certain embodiments, be performed in one or more distinct units.

Communication unit 1506 may be configured to perform the transmission functions of apparatus 1500. For example, communication unit 1506 may be configured to send, to the wireless device in response to the received indication that the wireless device has logged information available, a request to report the logged information. As another example, communication unit 1506 may be configured to forward the user data to a host computer or a wireless device.

Communication unit 1506 may transmit messages (e.g., to a wireless device and/or another network node). Communication unit 1506 may include a transmitter and/or a transceiver, such as RF transceiver circuitry 172 described above in relation to FIG. 11. Communication unit 1506 may include circuitry configured to transmit messages and/or signals (e.g., through wireless or wired means). In particular embodiments, communication unit 1506 may receive messages and/or signals for transmission from determining unit 1504 or any other unit of apparatus 1500. The functions of communication unit 1504 may, in certain embodiments, be performed in one or more distinct units.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EXAMPLE EMBODIMENTS

Example Embodiment 1. A method performed by a wireless device, the method comprising: in response to detecting a radio link failure (RLF) at the wireless device, logging information; in response to re-establishment after the RLF, reporting at least a portion of the logged information to a network node.

Example Embodiment 2. The method of embodiment 1, further comprising: detecting the RLF due to the expiry of timer 310.

Example Embodiment 3. The method of embodiment 2, further comprising: detecting a beam failure.

Example Embodiment 4. The method of embodiment 3, wherein the logged information comprises an indication for the detection of the beam failure.

Example Embodiment 5. The method of embodiment 4, wherein the logged information further comprises state information when the beam failure detection occurred, the state information comprising one or more of: beam measurement information on resources that were being monitored when the beam failure was detected; and beam measurement information on other resources.

Example Embodiment 6. The method of any of embodiments 2-5, wherein the logged information comprises beam measurement information of one or more serving cells on reference signals the wireless device is monitoring for radio link monitoring or beam failure detection.

Example Embodiment 7. The method of any of embodiments 2-6, wherein the logged information comprises beam measurement information of one or more neighboring cells on reference signals the wireless device is monitoring for radio link monitoring or beam failure detection.

Example Embodiment 8. The method of any of embodiments 2-7, wherein the logged information comprises beam measurement information of one or more serving cells on reference signals the wireless device is monitoring for radio resource management.

Example Embodiment 9. The method of any of embodiments 2-8, wherein the logged information comprises beam measurement information of one or more neighbor cells on reference signals the UE is monitoring for radio resource management.

Example Embodiment 10. The method of embodiment 1, further comprising: detecting the RLF due to an indication from medium access control of a random access channel failure.

Example Embodiment 11. The method of embodiment 10, wherein the random access channel failure is due to the wireless device reaching the maximum number of random access channel attempts.

Example Embodiment 12. The method of any of embodiments 10-11, further comprising: detecting a beam failure.

Example Embodiment 13. The method of embodiment 12, wherein the logged information comprises an indication for the detection of the beam failure.

Example Embodiment 14. The method of embodiment 13, wherein the logged information further comprises state information when the beam failure detection occurred, the state information comprising one or more of: beam measurement information on resources that were being monitored when the beam failure was detected; and beam measurement information on other resources.

Example Embodiment 15. The method of any of embodiments 10-14, further comprising: determining that beam failure recovery has been triggered.

Example Embodiment 16. The method of embodiment 15, wherein the logged information comprises an indication that beam failure recovery has been triggered.

Example Embodiment 17. The method of any of embodiments 15-16, wherein the logged information further comprises state information when the beam failure recovery occurred, the state information comprising one or more of: for each random access channel attempt, beam measurement information on resources and/or beams that were selected when the beam failure recovery was triggered; and beam measurement information on other resources.

Example Embodiment 18. The method of any of embodiments 10-17, wherein the logged information comprises beam measurement information of one or more serving cells on reference signals the wireless device is monitoring for radio link monitoring or beam failure detection.

Example Embodiment 19. The method of any of embodiments 10-18, wherein the logged information comprises beam measurement information of one or more neighboring cells on reference signals the wireless device is monitoring for radio link monitoring or beam failure detection.

Example Embodiment 20. The method of any of embodiments 10-19, wherein the logged information comprises beam measurement information of one or more serving cells on reference signals the wireless device is monitoring for radio resource management.

Example Embodiment 21. The method of any of embodiments 10-20, wherein the logged information comprises beam measurement information of one or more neighbor cells on reference signals the UE is monitoring for radio resource management.

Example Embodiment 22. The method of any of embodiments 10-21, wherein the logged information comprises beam information for different preamble retransmissions.

Example Embodiment 23. The method of embodiment 22, wherein the beam information for different preamble transmissions comprises one or more of: beam measurement information on each attempt; an occurrence of beam selection in each attempt; an occurrence of power ramping on a same beam; and a detection of contention for a given selected beam.

Example Embodiment 24. The method of any of embodiments 1-23, further comprising sending, to the network node, an indication that the wireless device has logged information available.

Example Embodiment 25. The method of embodiment 24, further comprising receiving, from the network node in response to the indication that the wireless device has logged information available, a request to report the logged information.

Example Embodiment 26. The method of embodiment 24, further comprising reporting the at least a portion of the logged information to the network node in response to the received request.

Example Embodiment 27. The method of any of the previous embodiments, further comprising: providing user data; and forwarding the user data to a host computer via the transmission to the network node.

Example Embodiment 28. A method performed by a network node, the method comprising: receiving, from a wireless device in response to re-establishment of the wireless device after radio link failure (RLF), a report comprising information logged by the wireless device in response to detecting the radio link failure.

Example Embodiment 29. The method of embodiment 28, wherein the RLF was due to the expiry of timer 310.

Example Embodiment 30. The method of embodiment 29, wherein the logged information comprises an indication that the wireless device detected a beam failure.

Example Embodiment 31. The method of embodiment 30, wherein the logged information further comprises state information when the beam failure detection occurred, the state information comprising one or more of: beam measurement information on resources that were being monitored by the wireless device when the beam failure was detected; and beam measurement information on other resources.

Example Embodiment 32. The method of any of embodiments 29-31, wherein the logged information comprises beam measurement information of one or more serving cells on reference signals the wireless device was monitoring for radio link monitoring or beam failure detection.

Example Embodiment 33. The method of any of embodiments 29-32, wherein the logged information comprises beam measurement information of one or more neighboring cells on reference signals the wireless device was monitoring for radio link monitoring or beam failure detection.

Example Embodiment 34. The method of any of embodiments 29-33, wherein the logged information comprises beam measurement information of one or more serving cells on reference signals the wireless device was monitoring for radio resource management.

Example Embodiment 35. The method of any of embodiments 29-34, wherein the logged information comprises beam measurement information of one or more neighbor cells on reference signals the UE was monitoring for radio resource management.

Example Embodiment 36. The method of embodiment 28, wherein the RLF was due to an indication from medium access control of a random access channel failure.

Example Embodiment 37. The method of embodiment 36, wherein the random access channel failure was due to the wireless device reaching the maximum number of random access channel attempts.

Example Embodiment 38. The method of any of embodiments 36-37, wherein the logged information comprises an indication that the wireless device detected a beam failure.

Example Embodiment 39. The method of embodiment 38, wherein the logged information further comprises state information when the beam failure detection occurred, the state information comprising one or more of: beam measurement information on resources that were being monitored when the beam failure was detected; and beam measurement information on other resources.

Example Embodiment 40. The method of any of embodiments 36-39, wherein the logged information comprises an indication that the wireless device detected that beam failure recovery was triggered.

Example Embodiment 41. The method of embodiment 40, wherein the logged information further comprises state information when the beam failure recovery occurred, the state information comprising one or more of: for each random access channel attempt, beam measurement information on resources and/or beams that were selected when the beam failure recovery was triggered; and beam measurement information on other resources.

Example Embodiment 42. The method of any of embodiments 36-41, wherein the logged information comprises beam measurement information of one or more serving cells on reference signals the wireless device was monitoring for radio link monitoring or beam failure detection.

Example Embodiment 43. The method of any of embodiments 36-42, wherein the logged information comprises beam measurement information of one or more neighboring cells on reference signals the wireless device was monitoring for radio link monitoring or beam failure detection.

Example Embodiment 44. The method of any of embodiments 36-43, wherein the logged information comprises beam measurement information of one or more serving cells on reference signals the wireless device was monitoring for radio resource management.

Example Embodiment 45. The method of any of embodiments 36-44, wherein the logged information comprises beam measurement information of one or more neighbor cells on reference signals the UE was monitoring for radio resource management.

Example Embodiment 46. The method of any of embodiments 36-45, wherein the logged information comprises beam information for different preamble retransmissions.

Example Embodiment 47. The method of embodiment 46, wherein the beam information for different preamble transmissions comprises one or more of: beam measurement information on each attempt; an occurrence of beam selection in each attempt; an occurrence of power ramping on a same beam; and a detection of contention for a given selected beam.

Example Embodiment 48. The method of any of embodiments 28-47, further comprising receiving, from the wireless device, an indication that the wireless device has logged information available.

Example Embodiment 49. The method of embodiment 48, further comprising sending, to the wireless device in response to the received indication that the wireless device has logged information available, a request to report the logged information.

Example Embodiment 50. The method of embodiment 49, further comprising receiving the report comprising information logged by the wireless device in response to the request.

Example Embodiment 51. The method of any of the previous embodiments, further comprising: obtaining user data; and forwarding the user data to a host computer or a wireless device.

Example Embodiment 52. A wireless device, the wireless device comprising: processing circuitry configured to perform any of the steps of any of Embodiments 1 to 27; and power supply circuitry configured to supply power to the wireless device.

Example Embodiment 53. A network node, the network node comprising: processing circuitry configured to perform any of the steps of any of Embodiments 28 to 51; power supply circuitry configured to supply power to the wireless device.

Example Embodiment 54. A user equipment (UE), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Embodiments 1 to 27; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 55. A computer program, the computer program comprising instructions which when executed on a computer perform any of the steps of any of Embodiments 1 to 27.

Example Embodiment 56. A computer program product comprising a computer program, the computer program comprising instructions which when executed on a computer perform any of the steps of any of Embodiments 1 to 27.

Example Embodiment 57. A non-transitory computer-readable storage medium or carrier comprising a computer program, the computer program comprising instructions which when executed on a computer perform any of the steps of any of Embodiments 1 to 27.

Example Embodiment 58. A computer program, the computer program comprising instructions which when executed on a computer perform any of the steps of any of Embodiments 28 to 51.

Example Embodiment 59. A computer program product comprising a computer program, the computer program comprising instructions which when executed on a computer perform any of the steps of any of Embodiments 28 to 51.

Example Embodiment 60. A non-transitory computer-readable storage medium or carrier comprising a computer program, the computer program comprising instructions which when executed on a computer perform any of the steps of any of Embodiments 28 to 51.

Example Embodiment 61. A communication system including a host computer comprising: processing circuitry configured to provide user data; and a communication interface configured to forward the user data to a cellular network for transmission to a user equipment (UE), wherein the cellular network comprises a network node having a radio interface and processing circuitry, the network node's processing circuitry configured to perform any of the steps of any of Embodiments 28 to 51.

Example Embodiment 62. The communication system of the pervious embodiment further including the network node.

Example Embodiment 63. The communication system of the previous 2 embodiments, further including the UE, wherein the UE is configured to communicate with the network node.

Example Embodiment 64. The communication system of the previous 3 embodiments, wherein: the processing circuitry of the host computer is configured to execute a host application, thereby providing the user data; and the UE comprises processing circuitry configured to execute a client application associated with the host application.

Example Embodiment 65. A method implemented in a communication system including a host computer, a network node and a user equipment (UE), the method comprising: at the host computer, providing user data; and at the host computer, initiating a transmission carrying the user data to the UE via a cellular network comprising the network node, wherein the network node performs any of the steps of any of Embodiments 28 to 51.

Example Embodiment 66. The method of the previous embodiment, further comprising, at the network node, transmitting the user data.

Example Embodiment 67. The method of the previous 2 embodiments, wherein the user data is provided at the host computer by executing a host application, the method further comprising, at the UE, executing a client application associated with the host application.

Example Embodiment 68. A user equipment (UE) configured to communicate with a network node, the UE comprising a radio interface and processing circuitry configured to performs the of the previous 3 embodiments.

Example Embodiment 69. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of Embodiments 1 to 27.

Example Embodiment 70. The communication system of the previous embodiment, wherein the cellular network further includes a network node configured to communicate with the UE.

Example Embodiment 71. The communication system of the previous 2 embodiments, wherein: the processing circuitry of the host computer is configured to execute a host application, thereby providing the user data; and the UE's processing circuitry is configured to execute a client application associated with the host application.

Example Embodiment 72. A method implemented in a communication system including a host computer, a network node and a user equipment (UE), the method comprising: at the host computer, providing user data; and at the host computer, initiating a transmission carrying the user data to the UE via a cellular network comprising the network node, wherein the UE performs any of the steps of any of Embodiments 1 to 27.

Example Embodiment 73. The method of the previous embodiment, further comprising at the UE, receiving the user data from the network node.

Example Embodiment 74. A communication system including a host computer comprising: communication interface configured to receive user data originating from a transmission from a user equipment (UE) to a network node, wherein the UE comprises a radio interface and processing circuitry, the UE's processing circuitry configured to perform any of the steps of any of Embodiments 1 to 27.

Example Embodiment 75. The communication system of the previous embodiment, further including the UE.

Example Embodiment 76. The communication system of the previous 2 embodiments, further including the network node, wherein the network node comprises a radio interface configured to communicate with the UE and a communication interface configured to forward to the host computer the user data carried by a transmission from the UE to the network node.

Example Embodiment 77. The communication system of the previous 3 embodiments, wherein: the processing circuitry of the host computer is configured to execute a host application; and the UE's processing circuitry is configured to execute a client application associated with the host application, thereby providing the user data.

Example Embodiment 78. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 79. A method implemented in a communication system including a host computer, a network node and a user equipment (UE), the method comprising: at the host computer, receiving user data transmitted to the network node from the UE, wherein the UE performs any of the steps of any of Embodiments 1 to 27.

Example Embodiment 80. The method of the previous embodiment, further comprising, at the UE, providing the user data to the network node.

Example Embodiment 81. The method of the previous 2 embodiments, further comprising: at the UE, executing a client application, thereby providing the user data to be transmitted; and at the host computer, executing a host application associated with the client application.

Example Embodiment 82. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 83. A communication system including a host computer comprising a communication interface configured to receive user data originating from a transmission from a user equipment (UE) to a network node, wherein the network node comprises a radio interface and processing circuitry, the network node's processing circuitry configured to perform any of the steps of any of Embodiments 28 to 51.

Example Embodiment 84. The communication system of the previous embodiment further including the network node.

Example Embodiment 85. The communication system of the previous 2 embodiments, further including the UE, wherein the UE is configured to communicate with the network node.

Example Embodiment 86. The communication system of the previous 3 embodiments, wherein: the processing circuitry of the host computer is configured to execute a host application; the UE is configured to execute a client application associated with the host application, thereby providing the user data to be received by the host computer.

Example Embodiment 87. A method implemented in a communication system including a host computer, a network node and a user equipment (UE), the method comprising: at the host computer, receiving, from the network node, user data originating from a transmission which the network node has received from the UE, wherein the UE performs any of the steps of any of Embodiments 1 to 27.

Example Embodiment 88. The method of the previous embodiment, further comprising at the network node, receiving the user data from the UE.

Example Embodiment 89. The method of the previous 2 embodiments, further comprising at the network node, initiating a transmission of the received user data to the host computer.

The invention claimed is:

1. A method performed by a wireless device, the method comprising:

in response to detecting a radio link failure, RLF, due to the expiry of a timer 310 at the wireless device, logging information related to radio link monitoring (RLM) resources, comprising beam measurement information of a serving cell on reference signals (RS) the UE is monitoring for RLM or beam failure detection (BFD), wherein the beam measurement information comprises indications of explicitly configured synchronization signal blocks (SSBs) or explicitly configured channel state information-reference signals (CSI-RSs); and in response to re-establishment after the RLF, reporting the logged information related to the RLM resources, wherein the logged information comprises a resource index associated with the RLM resources.

2. The method of claim 1, wherein detecting the RLF comprises detecting a beam failure recovery failure, wherein the logged information comprises an indication for the detection of the beam failure.

3. The method of claim 1, wherein the logged information further comprises state information when the detection of RLF occurred, the state information comprising one or more of:

beam measurement information on resources that were being monitored when the RLF was detected; and beam measurement information on other resources.

4. The method of claim 1, wherein the logged information comprises beam measurement information of two or more serving cells on reference signals the wireless device is monitoring.

5. The method of claim 1, further comprising detecting the RLF due to an indication from medium access control of a random access channel, RACH, failure.

6. The method of claim 1, wherein the logged information comprises beam measurement information of one or more neighboring cells on reference signals the wireless device is monitoring.

7. The method of claim 1, wherein the logged information comprises beam measurement information of one or more serving cells on reference signals the wireless device is monitoring for radio resource management.

8. The method of claim 1, further comprising sending, to the network node, an indication that the wireless device has logged information available.

9. The method of claim 1, further comprising:

receiving, from the network node in response to the indication that the wireless device has logged information available, a request to report the logged information; and reporting the at least a portion of the logged information to the network node in response to the received request.

10. A wireless device comprising:

processing circuitry configured to:

in response to detecting a radio link failure, RLF, due to the expiry of a timer 310 at the wireless device, log information related to radio link monitoring (RLM) resources, comprising beam measurement information of a serving cell on reference signals (RS) the UE is monitoring for RLM or beam failure detection (BFD), wherein the beam measurement information comprises indications of explicitly configured synchronization signal blocks (SSBs) or explicitly configured channel state information-reference signals (CSI-RSs); and in response to re-establishment after the RLF, report the logged information related to the RLM resources, wherein the logged information comprises a resource index associated with the RLM resources.

11. The wireless device of claim 10, wherein detecting the RLF comprises detecting a beam failure recovery failure, wherein the logged information comprises an indication for the detection of the beam failure.

12. The wireless device of claim 10, wherein the logged information further comprises state information when the detection of RLF occurred, the state information comprising one or more of:

beam measurement information on resources that were being monitored when the RLF was detected; and beam measurement information on other resources.

13. The wireless device of claim 10, wherein the logged information comprises beam measurement information of one or more serving cells on reference signals the wireless device is monitoring.

14. The wireless device of claim 10, wherein the processing circuitry is configured to detect the RLF due to an indication from medium access control of a random access channel, RACH, failure.

15. The wireless device of claim 10, wherein the logged information comprises beam measurement information of one or more neighboring cells on reference signals the wireless device is monitoring.

16. The wireless device of claim 10, wherein the logged information comprises beam measurement information of one or more serving cells on reference signals the wireless device is monitoring for radio resource management.

17. The wireless device of claim 10, wherein the processing circuitry is configured to send, to the network node, an indication that the wireless device has logged information available.

18. The wireless device of claim 10, wherein the processing circuitry is configured to:

receive, from the network node in response to the indication that the wireless device has logged information available, a request to report the logged information; and report the at least a portion of the logged information to the network node in response to the received request.

19. A network node comprising:

processing circuitry configured to:

receive, from a wireless device in response to re-establishment of the wireless device after radio link failure, RLF, due to the expiry of a timer 310, a report comprising information logged by the wireless device in response to detecting the RLF, wherein the logged information comprises a resource index associated with the RLM resources, wherein the logged information is related to radio link monitoring (RLM) resources, comprising beam measurement information of a serving cell on reference signals (RS) the UE is monitoring for RLM or beam failure detection (BFD), wherein the beam measurement information comprises indications of explicitly configured synchronization signal blocks (SSBs) or explicitly configured channel state information-reference signals (CSI-RSs).

20. The network node of claim 19, wherein the logged information comprises an indication that the wireless device detected a beam failure.

21. The network node of claim 19, wherein the logged information further comprises state information when the detection of the RLF occurred, the state information comprising one or more of:

beam measurement information on resources that were being monitored by the wireless device when the RLF was detected; and beam measurement information on other resources.

22. The network node of claim 19, wherein the logged information comprises beam measurement information of two or more serving cells on reference signals the wireless device was monitoring.

23. The network node of claim 19, wherein the logged information comprises beam measurement information of one or more neighboring cells on reference signals the wireless device was monitoring.

24. The network node of claim 19, wherein the logged information comprises beam measurement information of one or more serving cells on reference signals the wireless device was monitoring for radio resource management.

25. The network node of claim 19, wherein the processing circuitry is configured to receive, from the wireless device, an indication that the wireless device has logged information available.

26. The network node of claim 19, wherein the processing circuitry is configured to:

send, to the wireless device in response to the received indication that the wireless device has logged information available, a request to report the logged information; and receive the report comprising information logged by the wireless device in response to the request.

27. A method performed by a network node, the method comprising:

receiving, from a wireless device in response to re-establishment of the wireless device after radio link failure, RLF, due to the expiry of a timer 310, a report comprising information logged by the wireless device in response to detecting the RLF, wherein the logged information comprises a resource index associated with the RLM resources, wherein the logged information is related to radio link monitoring (RLM) resources, comprising beam measurement information of a serving cell on reference signals (RS) the UE is monitoring for RLM or beam failure detection (BFD), wherein the beam measurement information comprises indications of explicitly configured synchronization signal blocks (SSBs) or explicitly configured channel state information-reference signals (CSI-RSs).

* * * * *